(12) United States Patent
Miwa

(10) Patent No.: US 12,157,175 B2
(45) Date of Patent: Dec. 3, 2024

(54) RECIPROCATING CUTTING TOOL

(71) Applicant: MAKITA CORPORATION, Anjo (JP)

(72) Inventor: Yuki Miwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/710,314

(22) Filed: Mar. 31, 2022

(65) Prior Publication Data
US 2022/0362867 A1    Nov. 17, 2022

(30) Foreign Application Priority Data
May 13, 2021    (JP) .................................. 2021-081868

(51) Int. Cl.
*B23D 49/16*    (2006.01)

(52) U.S. Cl.
CPC .................................. *B23D 49/167* (2013.01)

(58) Field of Classification Search
CPC .................................................... B23D 49/167
See application file for complete search history.

(56) References Cited

U.S. PATENT DOCUMENTS

| | | | |
|---|---|---|---|
| 5,007,172 A * | 4/1991 | Palm | B23D 51/02 30/392 |
| 5,421,091 A * | 6/1995 | Gerritsen, Jr. | B23D 49/167 30/392 |
| 6,249,979 B1 | 6/2001 | Bednar et al. | |
| 6,272,757 B1 | 8/2001 | Roe | |
| 8,776,383 B2 * | 7/2014 | Sergyeyenko | B23D 49/162 30/373 |
| 9,700,949 B2 | 7/2017 | Wang | |
| 2006/0090348 A1 * | 5/2006 | Jiao | B23D 51/02 30/166.3 |
| 2009/0193668 A1 * | 8/2009 | Gadams | B23D 49/167 30/392 |

FOREIGN PATENT DOCUMENTS

| | | |
|---|---|---|
| CN | 20551638 U | 9/2016 |
| EP | 0 669 181 A1 | 8/1995 |
| JP | 2000-117535 A | 4/2000 |
| JP | 2002-210612 A | 7/2002 |
| WO | WO-2011135750 A1 * | 11/2011 ............. B23D 51/02 |

OTHER PUBLICATIONS

Oct. 8, 2024 Office Action issued in Japanese Patent Application No. 2021-081868.

* cited by examiner

*Primary Examiner* — Liang Dong
(74) *Attorney, Agent, or Firm* — Oliff PLC

(57) ABSTRACT

A reciprocating cutting tool includes a shoe that is less likely to slip off when pulled frontward, for positioning the shoe, beyond a predetermined position such as a maximum pull position. The reciprocating cutting tool includes a motor, a slider being rod-like and including a tip tool holder, a reciprocation converter that converts rotation of the motor to reciprocation in a direction in which the slider extends and transmits the reciprocation to the slider, a shoe slidable in a front-rear direction to come in contact with a workpiece to which the tip tool is applied, a shoe lock unit engageable with the shoe to restrict the shoe from sliding and disengageable from the shoe to allow the shoe to slide, and a pin that interferes with the shoe slid to a predetermined position.

14 Claims, 16 Drawing Sheets

RECIPROCATING CUTTING TOOL

CROSS-REFERENCE TO RELATED APPLICATIONS

This application claims the benefit of priority to Japanese Patent Application No. 2021-081868, filed on May 13, 2021, the entire contents of which are hereby incorporated by reference.

BACKGROUND

1. Technical Field

The present disclosure relates to a reciprocating cutting tool such as a rechargeable reciprocating saw.

2. Description of the Background

U.S. Pat. No. 6,272,757 (Patent Literature 1) and European Patent No. 0669181 (Patent Literature 2) describe a reciprocating saw including a shoe whose position is adjustable.

BRIEF SUMMARY

One or more aspects of the present disclosure are directed to a reciprocating cutting tool including a shoe that is less likely to slip off when being pulled frontward, for positioning the shoe, beyond a predetermined position such as a maximum pull position.

An aspect of the present disclosure provides a reciprocating cutting tool, including:
- a motor;
- a slider being rod-like, the slider including a tip tool holder at a distal end of the slider to receive a tip tool;
- a reciprocation converter configured to convert rotation of the motor to reciprocation in a direction in which the slider extends and to transmit the reciprocation to the slider;
- a shoe adjacent to the tip tool holder and slidable in a front-rear direction, the shoe being configured to come in contact with a workpiece to which the tip tool is applied;
- a shoe lock unit engageable with the shoe to restrict the shoe from sliding and disengageable from the shoe to allow the shoe to slide; and
- a pin configured to interfere with the shoe slid to a predetermined position.

The reciprocating cutting tool according to the above aspect of the present disclosure includes the shoe that is less likely to slip off when being pulled frontward beyond the predetermined position such as the maximum pull position.

DETAILED DESCRIPTION

Embodiments and modifications of the present disclosure will now be described with reference to the drawings as appropriate.

A reciprocating tool according to embodiments of the present disclosure is, for example, a power tool or a reciprocating cutting tool. More specifically, the reciprocating cutting tool is a reciprocating saw.

The directional terms such as front, rear, up, down, right, and left in the embodiments and the modifications are defined for ease of explanation, and may be changed depending on, for example, at least the operating situations or the status of a movable member.

The present disclosure is not limited to the embodiments and the modifications.

Figure 1:
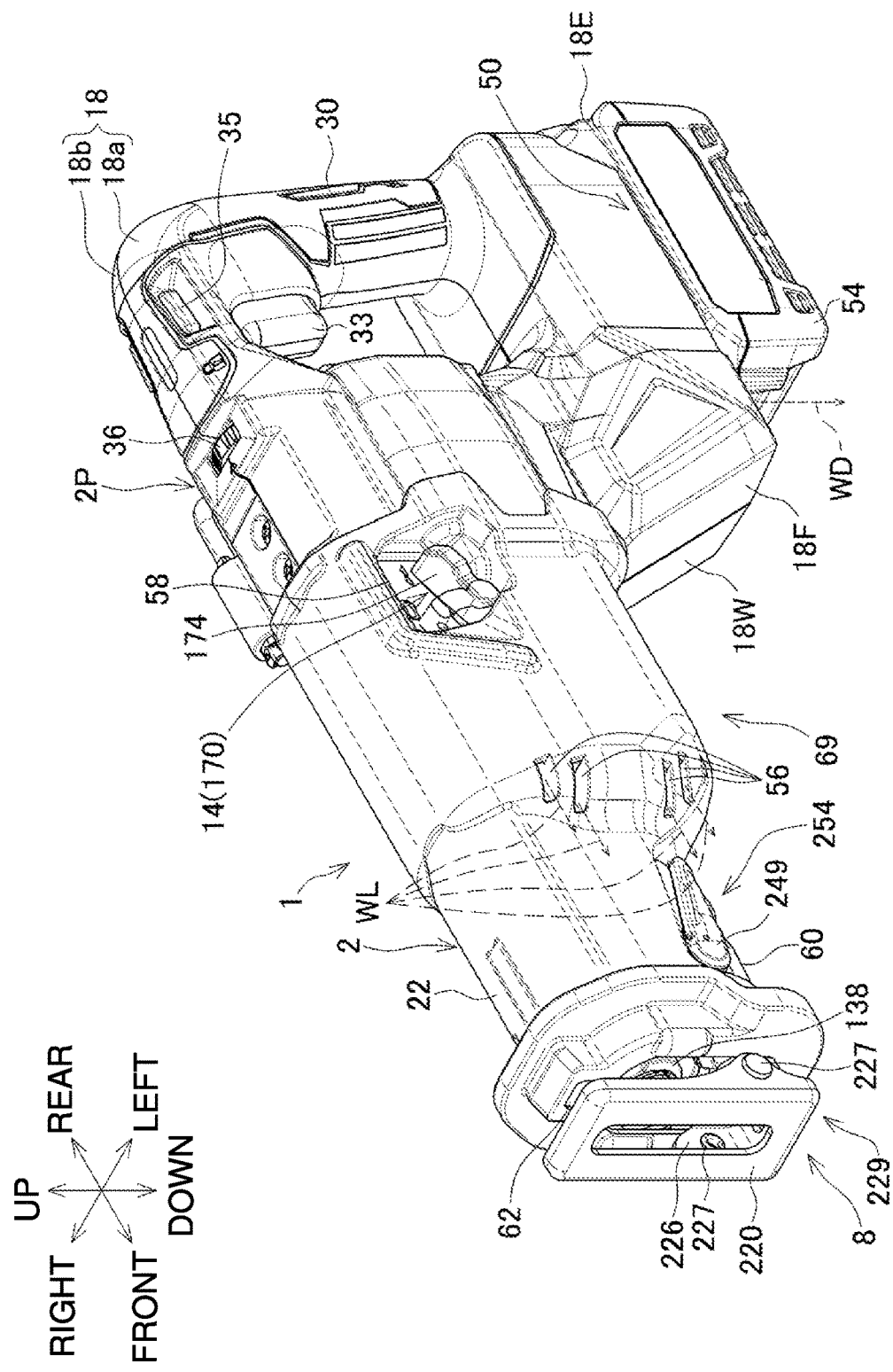
FIG. 1 is a perspective view of a reciprocating saw according to an embodiment of the present disclosure as viewed from the upper left front.
Figure 2:
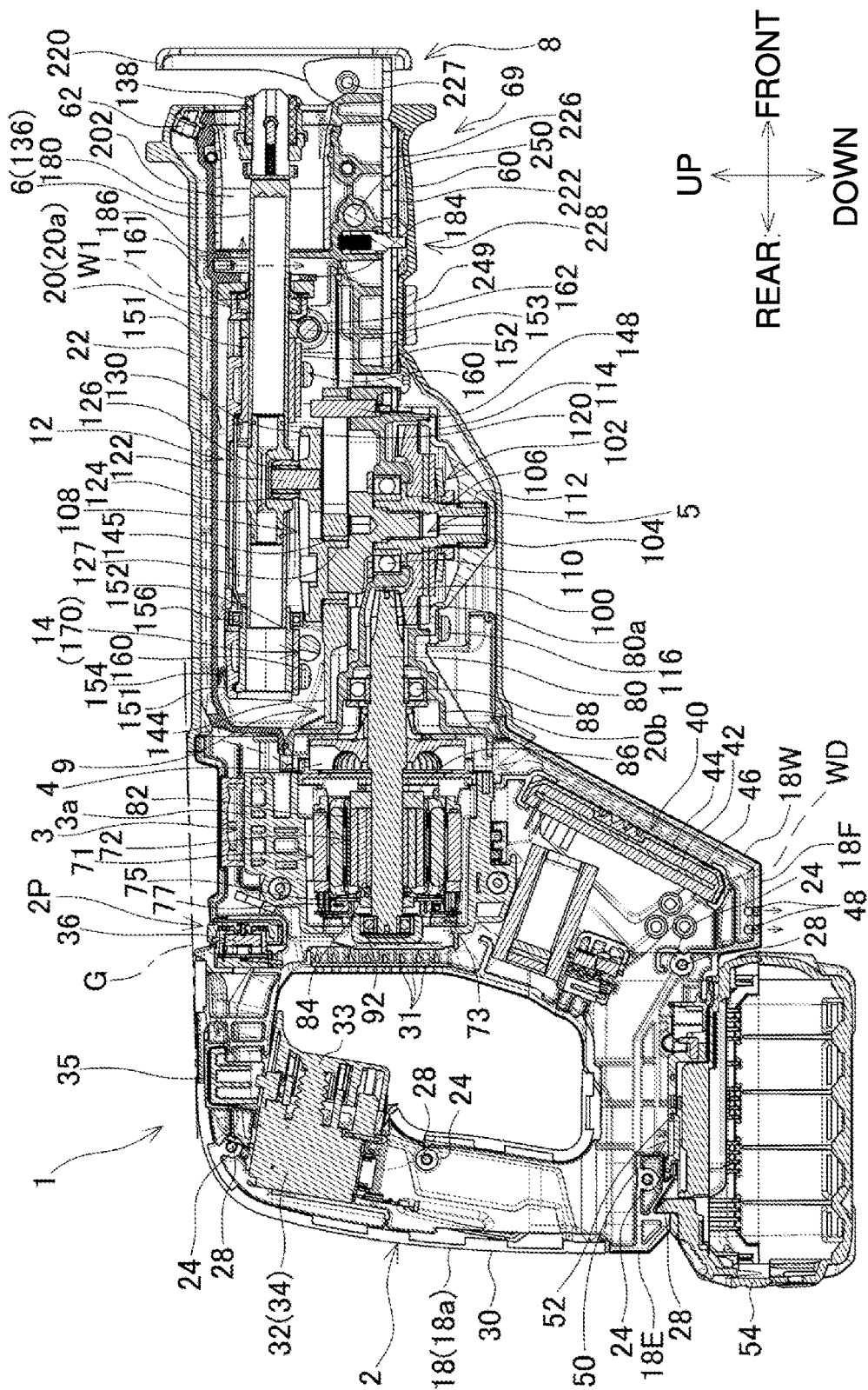
FIG. 2 is a central longitudinal sectional view of the reciprocating saw in FIG. 1.
Figure 3:
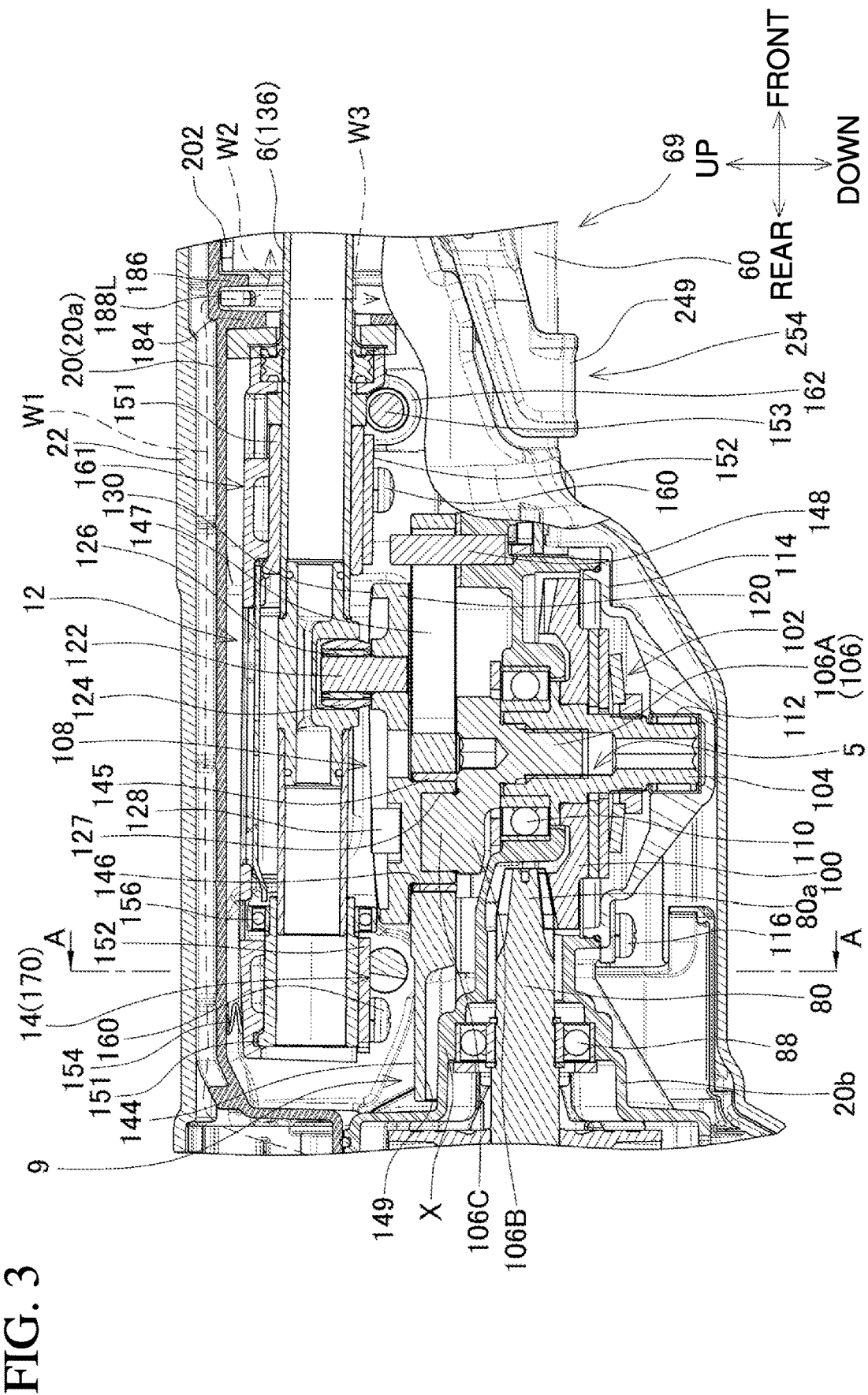
FIG. 3 is a partially enlarged view of the reciprocating saw in FIG. 2.
Figure 4:
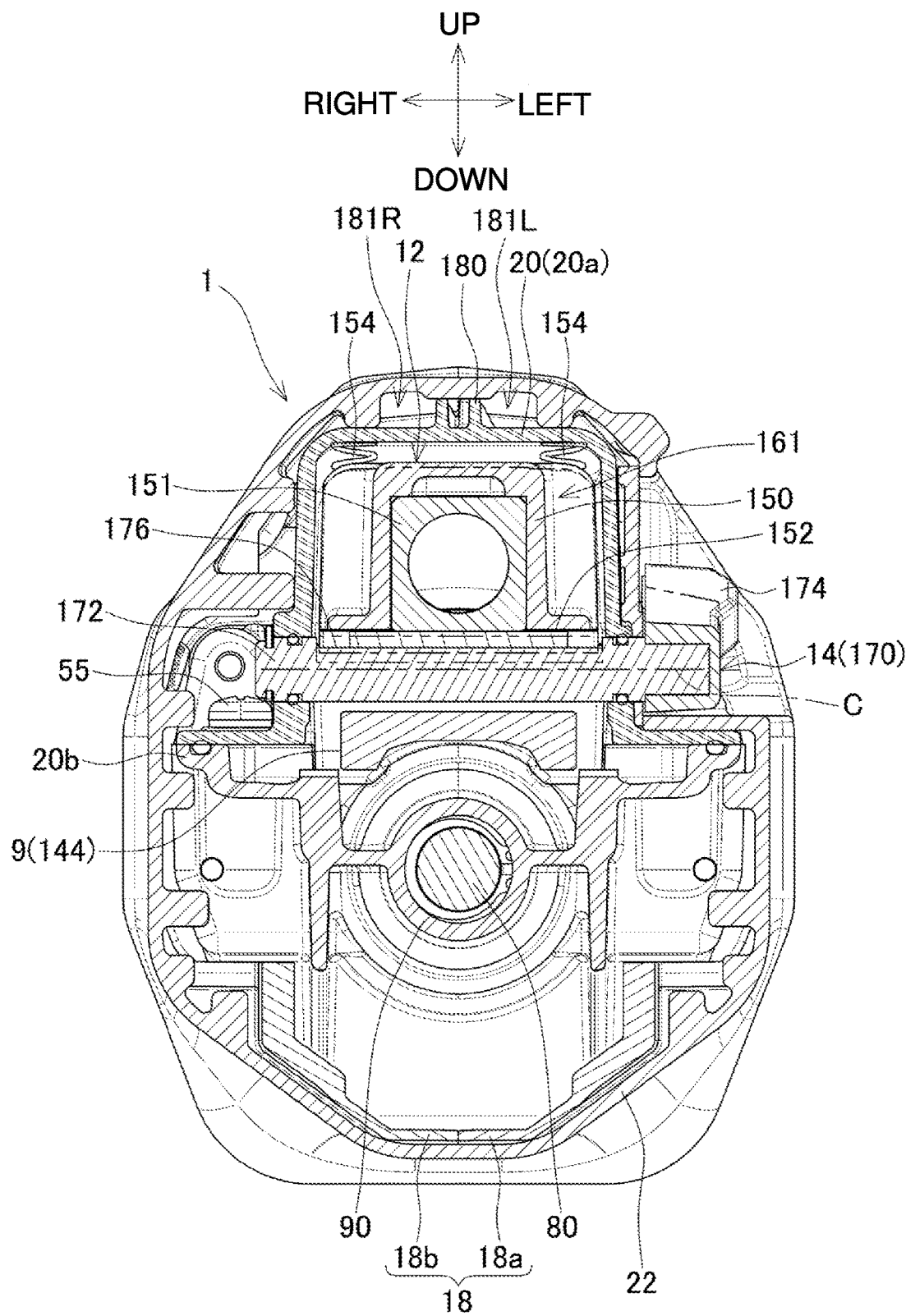
FIG. 4 is a cross-sectional view taken along line A-A in FIG. 3.

FIG. 1 is a perspective view of a reciprocating saw 1 according to an embodiment of the present disclosure as viewed from the upper left front. FIG. 2 is a central longitudinal sectional view of the reciprocating saw in FIG. 1. FIG. 3 is a partially enlarged view of the reciprocating saw in FIG. 2. FIG. 4 is a cross-sectional view taken along line A-A in FIG. 3.

Figure 9:
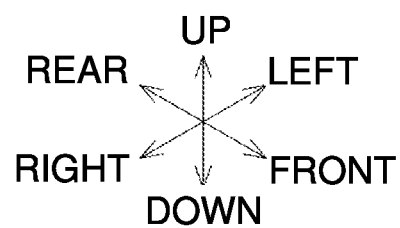
FIG. 9 is a perspective view of a front portion of the reciprocating saw in FIG. 1 as viewed from the upper right front.
Figure 9:
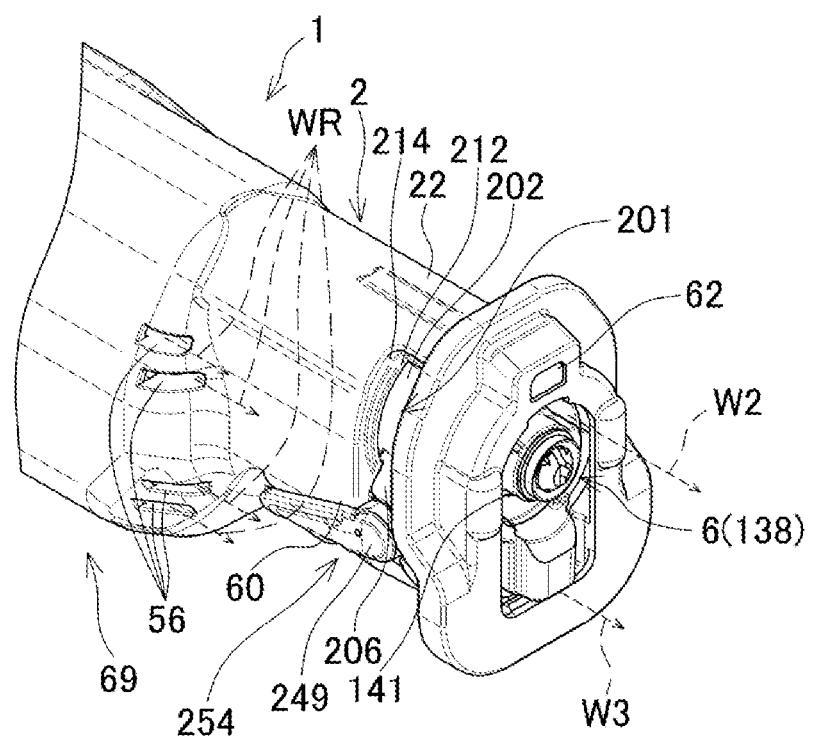
Figure 13:
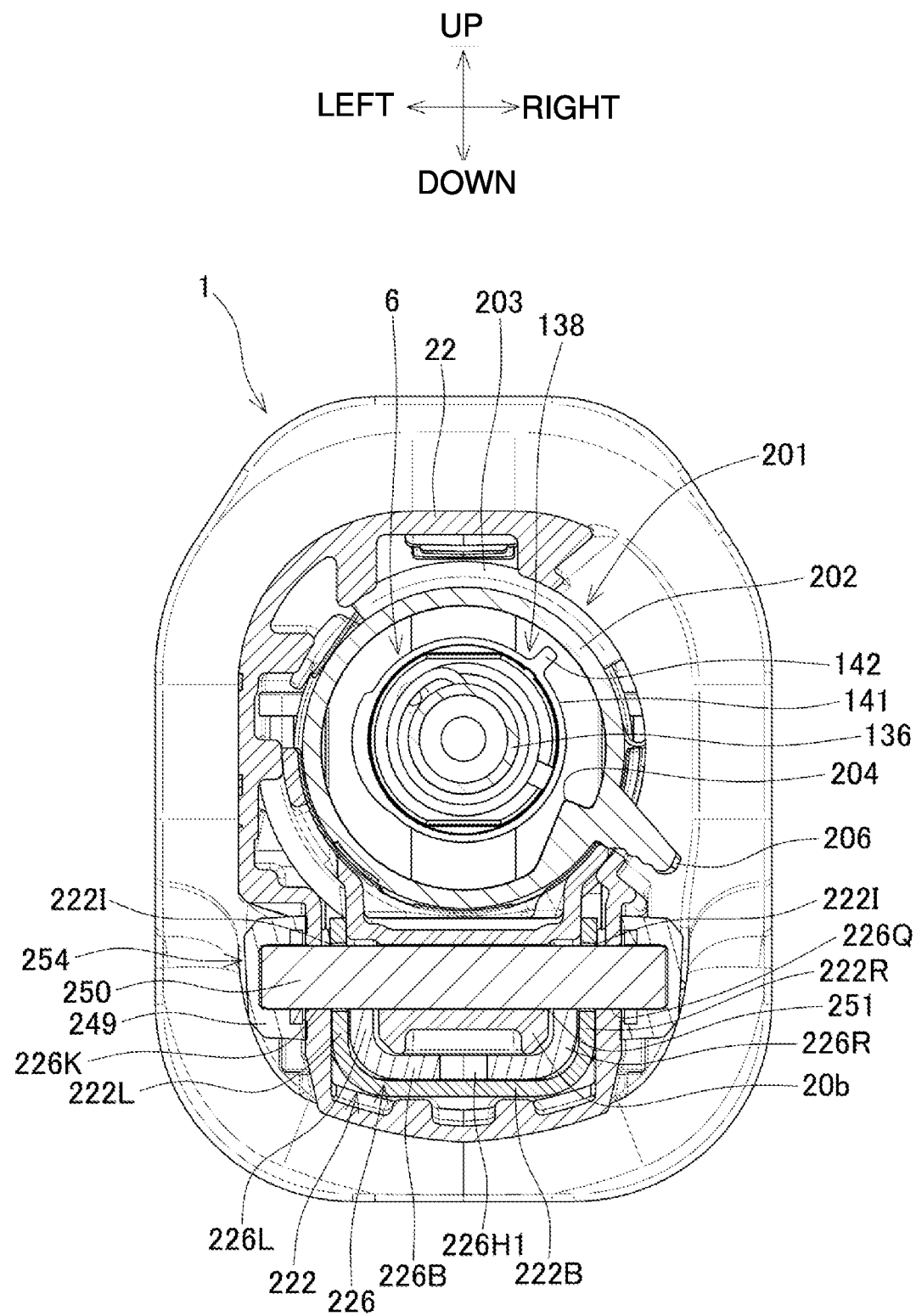
FIG. 13 is a cross-sectional view taken along line B-B in FIG. 10.
Figure 14:
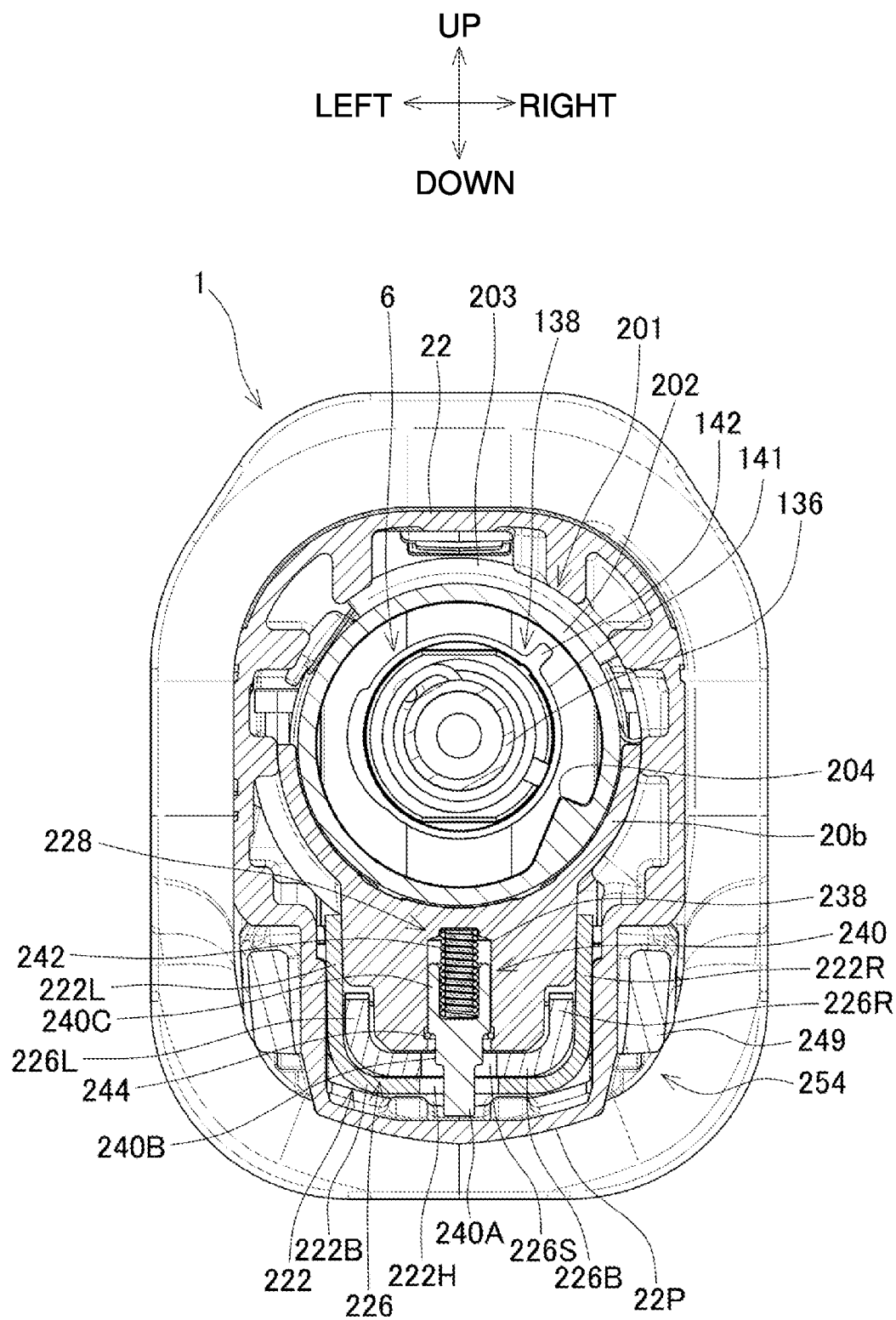
FIG. 14 is a cross-sectional view taken along line C-C in FIG. 10.

The reciprocating saw 1 includes a body housing 2, a motor 3, a fan 4, a reciprocation converter 5, a slider 6 as an output section, a guide shoe unit 8, a counterweight 9, an orbital unit 12, an orbital switcher 14, and a release unit 201 (refer to, for example, FIGS. 9, 13, and 14).

The body housing 2 is a support frame that directly or indirectly holds the components.

The body housing 2 includes a motor housing 18, a power transmission housing 20, and a cover 22.

The motor housing 18 has a cylindrical front portion. The motor housing 18 is looped at its rear. The motor housing 18 is formed from plastic.

The motor housing 18 holds the motor 3 in its upper front portion. The motor 3 includes a motor case 3a. The motor case 3a defines an outer wall of the motor 3. The motor case 3a is cylindrical. The motor case 3a includes an opening in its front portion. The motor housing 18 is connected to the power transmission housing 20 with the motor case 3a.

The motor housing 18 is halved into a left motor housing 18a and a right motor housing 18b.

The left motor housing 18a has multiple screw bosses 24. The right motor housing 18b has multiple screw holes (not shown). The screw holes are aligned with the screw bosses 24.

Multiple screws 28 are placed through the screw bosses 24 and the screw holes laterally, fastening the right motor housing 18b to the left motor housing 18a.

The motor housing 18 includes a first grip 30 at its rear. The first grip 30 extends vertically to be grippable by a user.

The motor housing 18 has multiple inlets 31 in a portion of the looped rear that faces the front surface of the first grip 30. The inlets 31 are aligned vertically. Each inlet 31 extends laterally. The motor 3 is located in front of the inlets 31.

The first grip 30 holds a trigger switch 32 in its upper portion.

The trigger switch 32 includes a trigger 33 and a switch body 34.

The trigger 33 is exposed at the upper front of the first grip 30. The user pulls the trigger 33 with a fingertip to move the trigger 33 backward. The trigger 33 is in front of the switch body 34. The trigger 33 is connected to the switch body 34.

The switch body 34 is located in the upper portion of the first grip 30. The switch body 34 is turned on or off in response to an operation on the trigger 33. The switch body 34 is turned on when the pull of the trigger 33 reaches or exceeds a predetermined amount. The switch body 34 outputs a signal (e.g., a resistance) that varies in accordance with the pull reaching or exceeding the predetermined amount. In response to the signal, the rotational speed of the motor 3 changes.

The trigger 33 turns on or off the motor 3 through the switch body 34. The trigger 33 is a switch for turning on or off the motor 3.

A lock-off button 35 is located above the trigger 33. The lock-off button 35 is a laterally elongated plate.

The lock-off button 35 has its right and left portions exposed from the motor housing 18. The lock-off button 35 is slidable rightward when its left portion is pressed. The lock-off button 35 is slidable leftward when its right portion is pressed.

The lock-off button 35 slid to a right position prevents the trigger 33 from being pulled. The motor 3 cannot be turned on in this state. The lock-off button 35 slid to a left position permits the trigger 33 to be pulled. The motor 3 can be turned on in this state.

A speed setting dial 36 is located in front of the lock-off button 35. The speed setting dial 36 is a rotatable disk extending vertically and laterally. The speed setting dial 36 has its upper portion exposed from the motor housing 18.

The speed setting dial 36 outputs a signal corresponding to its rotational position (angle). In response to the signal, a maximum rotational speed of the motor 3 is set.

The speed setting dial 36 is received in a recess 2P on an upper portion of the body housing 2 (motor housing 18). The recess 2P is recessed downward from the surrounding portion. The speed setting dial 36 is positioned below the imaginary plane in contact with the front and rear sides of the recess 2P, as indicated by the dot and dash line G in FIG. 2. This structure reduces the likelihood that the user unintentionally touches the speed setting dial 36 and accidentally performs an operation on the speed setting dial 36. Any object approaching the body housing 2 from above and touching an upper portion of the body housing 2 is less likely to enter the recess 2P (below the dot and chain line G). The speed setting dial 36 is thus protected from being collided with objects.

The motor housing 18 holds a controller 40 below the motor 3. The controller 40 includes a control circuit board 42 and a controller case 44.

The control circuit board 42 controls the motor 3. The control circuit board 42 includes a microcomputer and multiple (six or twelve) switching elements.

The controller case 44 is a metal (aluminum) box open upward and rearward without a lid. The controller case 44 accommodates the control circuit board 42. The control circuit board 42 is covered with a mold layer 46 of a material injected in the controller case 44.

The controller 40 is located below the motor 3. The controller 40 extends diagonally, or more specifically, upward toward the front.

The controller case 44 has its front surface aligned with a front wall 18W of a lower front portion 18F of the motor housing 18.

The motor housing 18 has multiple lower rear outlets 48 in the lower front portion 18F. The lower rear outlets 48 are aligned in the front-rear and lateral directions. Each lower rear outlet 48 extends laterally.

The lower rear outlets 48 are located downward from a portion holding the controller 40 in the motor housing 18. More specifically, the lower rear outlets 48 are opposite to the fan 4 from the controller 40 in the motor housing 18.

A space between the front surface of the controller case 44 and the front wall 18W serves as an outlet passage allowing a cooling outlet blow WD to pass from the fan 4. The outlet blow WD exits through the lower rear outlets 48.

The motor housing 18 has a lower rear portion 18E recessed upward from the lower front portion 18F of the motor housing 18.

A battery mount 50 is located on the lower rear portion 18E of the motor housing 18.

The lower rear portion 18E of the motor housing 18 has an opening.

The battery mount 50 holds a terminal mount 52. The terminal mount 52 includes a box-like front portion and a plate-like rear portion. The terminal mount 52 covers the opening in the lower rear portion 18E of the motor housing 18 and is exposed through the opening. The terminal mount 52 holds multiple terminal plates (not shown).

The battery mount 50 receives a battery 54 in a manner slidable forward from the rear. The mounted battery 54 is electrically connected to the terminal mount 52 (terminal plates). The battery 54 powers the motor 3.

The power transmission housing 20 supports the components of the reciprocation converter 5, the slider 6, the counterweight 9, the orbital unit 12, and the orbital switcher 14 directly or indirectly. The power transmission housing 20 is formed from metal such as an aluminum alloy. The power transmission housing 20 is connected to the front of the motor housing 18.

The power transmission housing 20 is halved, and is a cylinder having openings in its front and rear ends. The power transmission housing 20 houses the reciprocation converter 5. The power transmission housing 20 is thus also a converter housing.

The power transmission housing 20 includes an upper power transmission housing 20a, a lower power transmission housing 20b, and a bearing box 114.

The upper power transmission housing 20a is fastened to the lower power transmission housing 20b with multiple screws 55 (FIGS. 4 and 16) extending vertically.

The lower power transmission housing 20b has its rear end fastened to the front end of the motor housing 18 with multiple screws (not shown) extending in a front-rear direction from the motor case 3a.

The cover 22 is cylindrical. The cover 22 is externally mounted on the power transmission housing 20. The cover 22 is elastic (rubbery) and serves as a thermally or electrically insulating cover. The cover 22 is outward from the power transmission housing 20. The cover 22 may not be a component of the body housing 2. The cover 22 may be formed from plastic.

The rear end of the cover 22 covers the front end of the motor housing 18. The cover 22 is continuous with the motor housing 18 on the outer surface.

The cover 22 has multiple body outlets 56 on the right and left of its middle portion (FIGS. 1 and 9). The body outlets 56 on the left are aligned vertically. The body outlets 56 (FIG. 9) on the right are aligned vertically. Each body outlet 56 is elongated in the front-rear direction. The body outlets 56 are located frontward from the fan 4.

The cover 22 has an orbital switching lever hole 58 in its left rear portion (FIG. 1). The orbital switching lever hole 58 extends in the vertical and front-rear directions.

A lower portion of the cover 22, or more specifically, a front portion of the body housing 2, serves as a second grip 60. The second grip 60 is grippable by a user.

At least the number of sections in the body housing 2, the size of each section in the body housing 2, or the shape of each section in the body housing 2 may be modified variously. For example, the rear portion of the motor housing 18 may be a separate handle housing. The battery mount 50 may be separate from the motor housing 18.

A lamp 62 is located between an upper front portion of the power transmission housing 20 and an upper front portion of the cover 22. The lamp 62 includes a light-emitting diode (LED) board. The LED board receives an LED.

The lamp 62 emits light forward. The lamp 62 can illuminate the area around the cutting position ahead of the slider 6.

The motor 3, the switch body 34, the speed setting dial 36, the terminal mount 52 (terminal plates), and the lamp 62 each are electrically connected to the control circuit board 42 with multiple lead wires (not shown).

The portion of the motor housing 18 holding the motor 3 (a portion outside the motor 3), the power transmission housing 20, the components held by these housings, and the cover 22 are included in a body 69 of the reciprocating saw 1.

The motor 3 is an electric motor. The motor 3 is an inner-rotor brushless motor. The motor 3 is driven with direct current (DC).

The motor 3 includes the motor case 3a, a stator 71, and a rotor 72.

The motor case 3a is held on the motor housing 18.

The stator 71 includes multiple (six) coils 73. The stator 71 is cylindrical.

A sensor board 75 is fixed to the stator 71. The sensor board 75 receives multiple (three) magnetic sensors on its rear surface. Each magnetic sensor receives a rotation detection signal indicating the rotational position of the rotor 72 to obtain the rotational state of the rotor 72.

The sensor board 75 and the control circuit board 42 are electrically connected to each other with multiple (six) lead wires (signal lines, not shown). The signal lines extend through the lower front portion 18F of the motor housing 18.

A coil connector 77 is located at the stator 71. The coil connector 77 serves as a contact for electrically connecting the coils 73 to one another in a predetermined manner. The coil connector 77 receives first ends of multiple (three) lead wires (power supply lines, not shown). The three power supply lines are used for three phases. Each power supply line extends through the lower front portion 18F of the motor housing 18. Each power supply line has a second end connected to the control circuit board 42.

The rotor 72 is located inside the stator 71.

The rotor 72 includes a motor shaft 80, a rotor core 82, multiple (four) permanent magnets 84, and a sleeve 86.

The motor shaft 80 is cylindrical and extends in the front-rear direction. The motor shaft 80 is formed from metal. The motor shaft 80 rotates on its axis. The motor shaft 80 has its front end extending into the rear end of the power transmission housing 20. The motor shaft 80 receives a pinion gear 80a on its front end. The pinion gear 80a includes multiple teeth.

The rotor core 82 is cylindrical. The rotor core 82 has an axis extending in the front-rear direction. The rotor core 82 includes multiple steel plates stacked on one another in the front-rear direction. Each steel plate extends in the vertical and lateral directions. The rotor core 82 is fixed on the outer surface of the motor shaft 80.

Each permanent magnet 84 is a plate. The four permanent magnets 84 are circumferentially aligned in the rotor core 82 to alternate in polarity. The four permanent magnets 84 are not in contact with one another.

The sleeve 86 is a metal (brass) ring member. The sleeve 86 is fixed to the front of the rotor core 82 and the front of the permanent magnets 84, and is fixed on the motor shaft 80. The sleeve 86 fixed to the permanent magnets 84 can prevent the permanent magnets 84 from slipping off the motor shaft 80.

A motor front bearing 88 is located in front of the sleeve 86. The motor front bearing 88 surrounds a front portion of the motor shaft 80. The motor front bearing 88 supports the motor shaft 80 in a manner rotatable on the axis.

The motor front bearing 88 is held on a rear portion of the lower power transmission housing 20b.

A motor rear bearing 92 surrounds the rear end of the motor shaft 80. The motor rear bearing 92 supports the motor shaft 80 in a manner rotatable on the axis. The motor rear bearing 92 is held on the motor case 3a.

The fan 4 is located in a middle portion of the motor shaft 80, behind the motor front bearing 88, and in front of the sleeve 86. The fan 4 is a centrifugal fan with multiple blades. The fan 4 rotates and forces air radially outward. The fan 4 is fixed to the motor shaft 80 integrally to rotate together. The fan 4 is located on the motor shaft 80. The fan 4 is held on the motor housing 18 with the rotor 72 and the lower power transmission housing 20b.

The lower power transmission housing 20b is in front of the fan 4.

The upper end of an air passage (lower air passage) defined between the front surface of the controller case 44 and the front wall 18W of the lower front portion 18F of the motor housing 18 is located below the fan 4.

The fan 4 may be a component of the motor 3.

Figure 5:
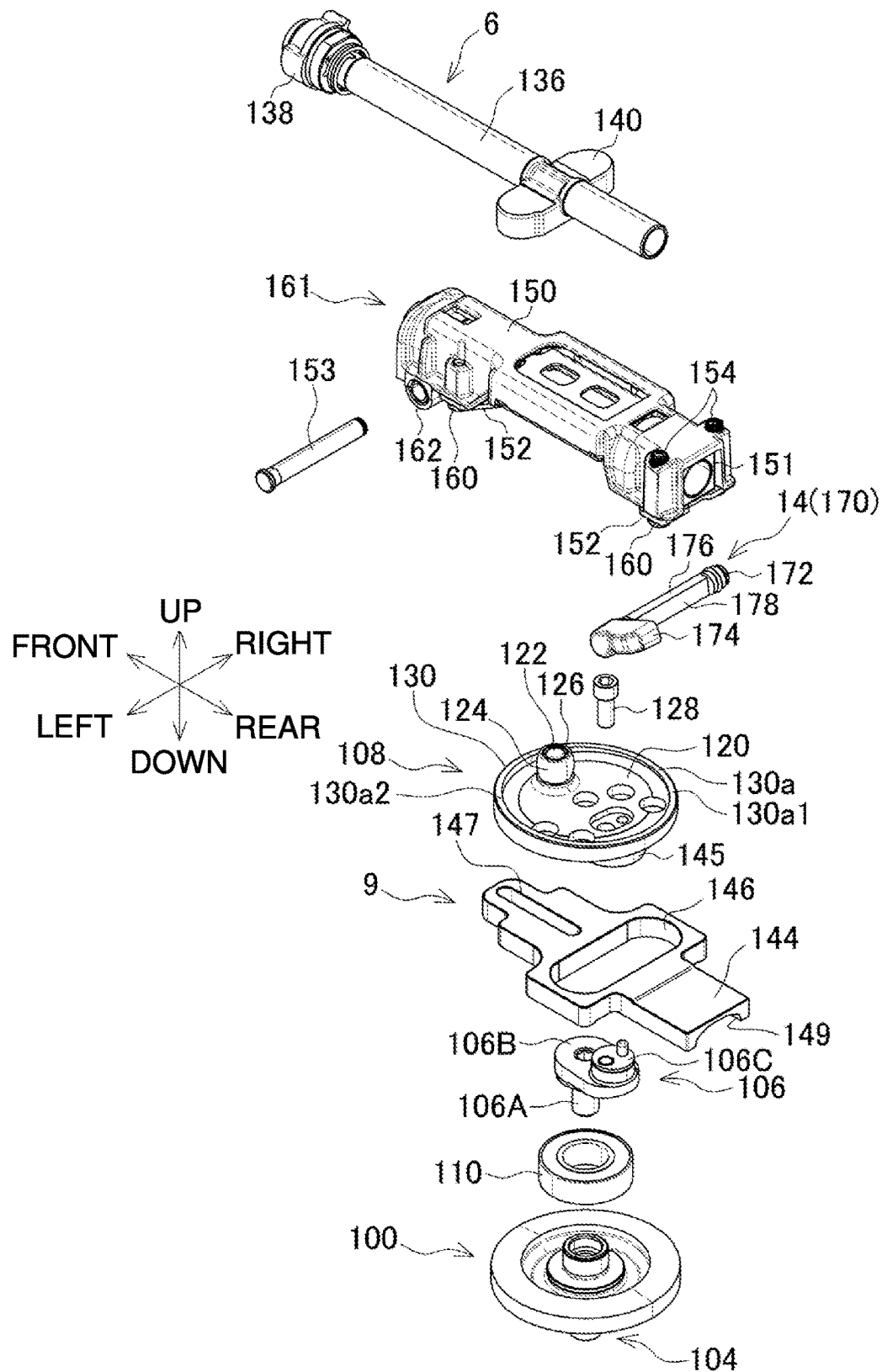
FIG. 5 is a partially exploded perspective view of a reciprocation converter in FIG. 2 and its surrounding components as viewed from above.
Figure 6:
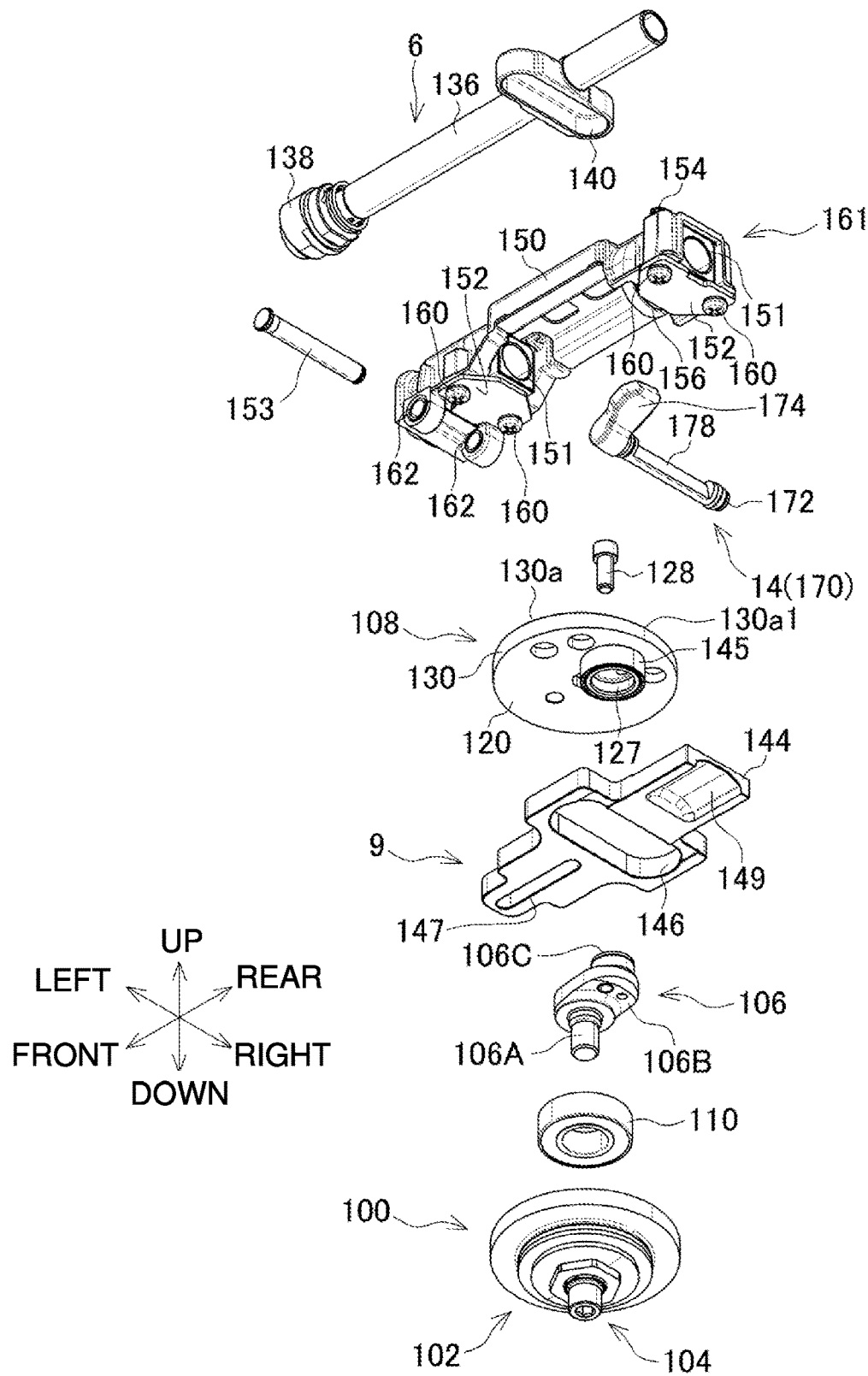
FIG. 6 is a partially exploded perspective view of the reciprocation converter in FIG. 2 and its surrounding components as viewed from below.
Figure 7:
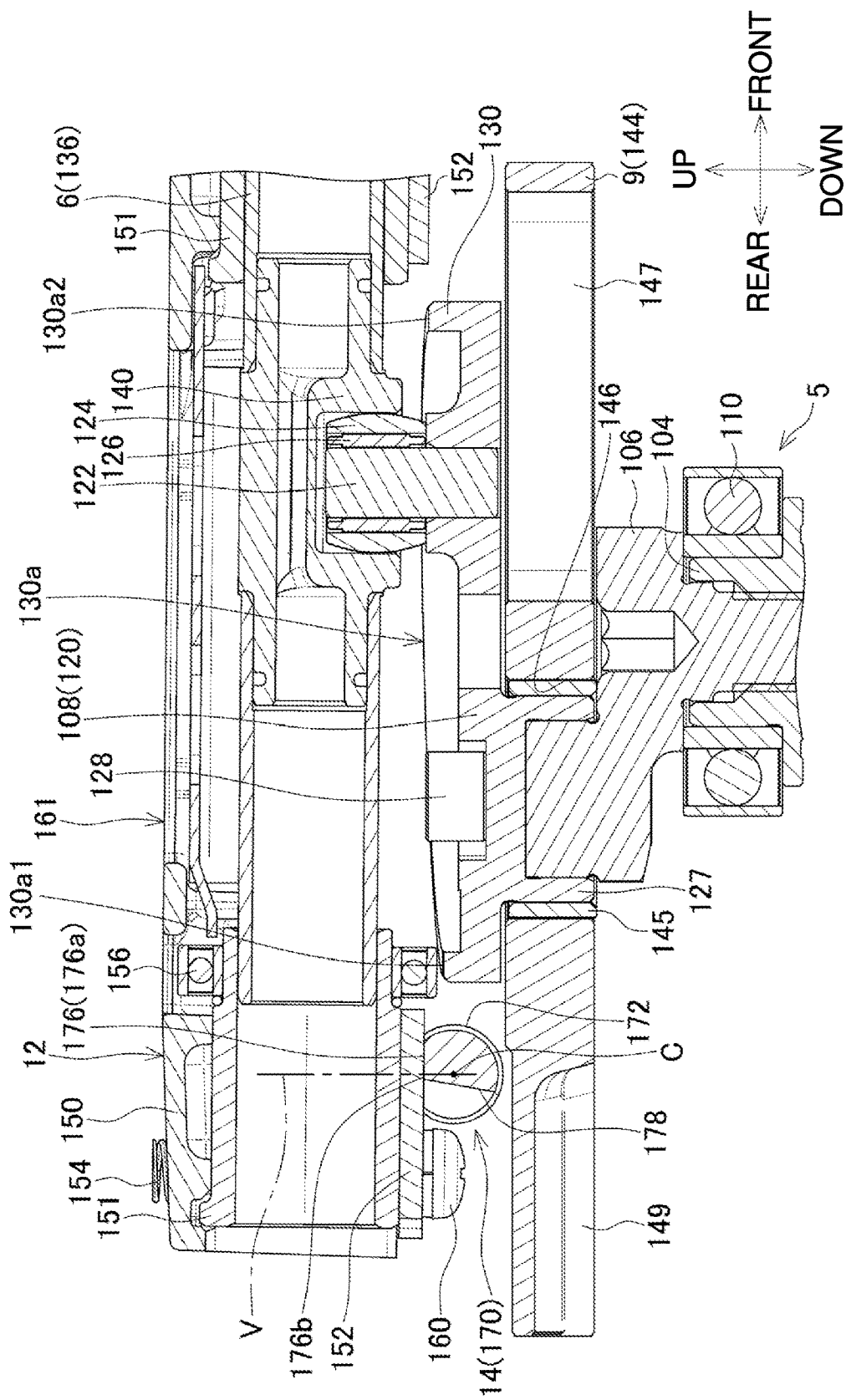
FIG. 7 is a central longitudinal sectional view of part of the reciprocation converter in FIG. 2 and its surrounding components.
Figure 8:
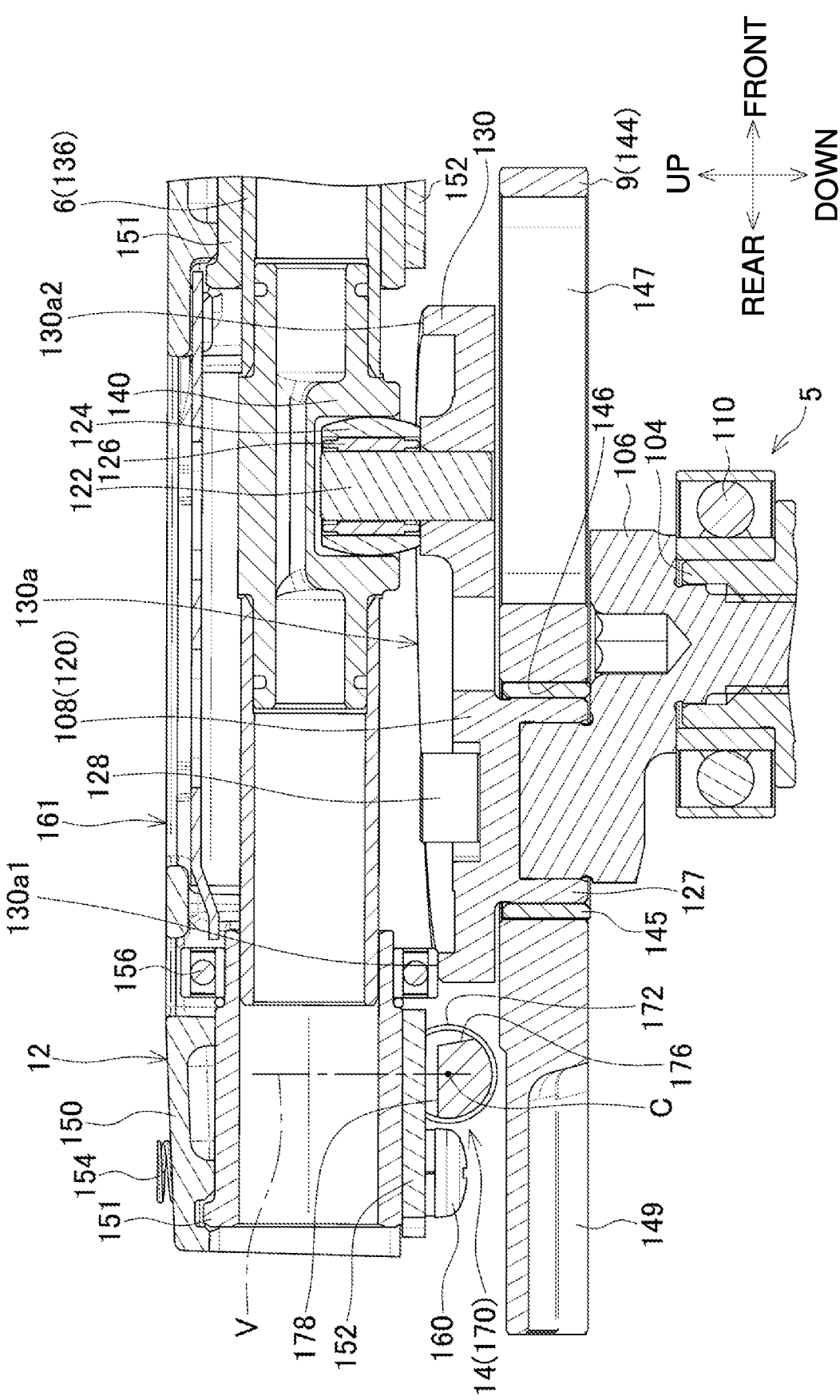
FIG. 8 is a central longitudinal sectional view of the reciprocation converter, with a knob of an orbital switching lever pressed forward in the state in FIG. 7.

FIGS. 5 and 6 each are a partially exploded perspective view of the reciprocation converter 5 and its surrounding components as viewed from above or below. FIG. 7 is a central longitudinal sectional view of part of the reciprocation converter 5 and its surrounding components. FIG. 8 is a central longitudinal sectional view of the part of the reciprocation converter 5, with a knob 174 of an orbital switching lever 170 pressed forward (refer to the two-dot chain line in FIG. 1) in the state in FIG. 7.

The reciprocation converter 5 is a power transmission unit for transmitting power from the motor 3 to the slider 6. The reciprocation converter 5 converts rotational motion of the motor shaft 80 of the motor 3 to reciprocating motion of the slider 6 and transmits the reciprocating motion. The reciprocation converter 5 is held on the power transmission housing 20. The reciprocation converter 5 is located between the motor 3 and the slider 6.

The reciprocation converter 5 includes a bevel gear 100, a torque limiter 102, a countershaft 104, a crank base 106, and a crank cam 108.

The bevel gear 100 is a disk extending in the front-rear and lateral directions. The bevel gear 100 includes bevel teeth (not shown) on the periphery of its upper surface. The bevel gear 100 meshes with the pinion gear 80a.

The bevel gear 100 rotates on a vertical rotation axis including its center in the front-rear and lateral directions.

The torque limiter 102 is located between the bevel gear 100 and the countershaft 104.

The torque limiter 102 transmits power from the bevel gear 100 to the countershaft 104. The torque limiter 102 includes upper and lower flat plates in close contact with each other under an urging force from an elastic member. In response to an excessive load from the bevel gear 100, the flat plates separate from each other against the urging force. The torque limiter 102 thus protects the bevel gear 100 and the motor 3 under the load.

The countershaft 104 is cylindrical and extends vertically.

The countershaft 104 is supported by an upper countershaft bearing 110 and a lower countershaft bearing 112 in a manner rotatable coaxially with the bevel gear 100 on the rotation axis (FIGS. 2 and 3).

The upper countershaft bearing 110 is held on the lower power transmission housing 20b. The lower countershaft bearing 112 is a needle bearing. The lower countershaft bearing 112 is held in a dish-shaped bearing box 114 (FIGS. 2 and 3). The bearing box 114 is fastened to the lower power transmission housing 20b with multiple screws 116 extending vertically. In FIGS. 2 and 3, one screw 116 is shown.

The crank base 106 is crank-shaped.

The crank base 106 includes a cylindrical portion 106A on the bottom. The cylindrical portion 106A is fastened to an upper portion of the countershaft 104 with a screw.

The crank base 106 includes a plate 106B extending in the front-rear and lateral directions in the middle.

The crank base 106 includes an eccentric disk 106C extending in the front-rear and lateral directions on its top. The center of the eccentric disk 106C is off the central axis of a lower portion of the crank base 106.

The crank cam 108 includes a crank cam body 120, an eccentric pin 122, a convex roller 124, and a bearing 126.

The crank cam body 120 is a disk extending in the front-rear and lateral directions. The crank cam body 120 has a vertical central axis that is aligned with the rotation axis of the bevel gear 100. The crank cam body 120 has a coupler 127 on its bottom. The coupler 127 is cylindrical and protrudes downward from the other portion. The coupler 127 receives the eccentric disk 106C in the crank base 106 coupled with a screw 128 press-fitted in the coupler 127. The crank cam body 120 also includes a cam 130 on the periphery of the upper surface of the crank cam body 120.

The cam 130 protrudes upward from the adjacent portion. The cam 130 is annular as viewed from above. The cam 130 has a vertical length changing gradually in the circumferential direction (refer to FIGS. 7 and 8, for example). In other words, the upper surface of the cam 130 serves as a cam surface 130a. The cam surface 130a has a height that gradually changes from a lowest point 130a1 to a highest point 130a2.

The eccentric pin 122 is cylindrical and extends vertically. The eccentric pin 122 has its lower portion received in a vertical hole in the crank cam body 120. The hole is radially off the central axis of the crank cam body 120.

The convex roller 124 is cylindrical. The convex roller 124 has an outer surface with a diameter increasing toward its vertically middle portion.

The convex roller 124 surrounds an upper portion of the eccentric pin 122 with the bearing 126 between them. The convex roller 124 is supported in a manner rotatable on a vertical rotation axis. The bearing 126 is a needle bearing.

The slider 6 includes a slider body 136 and a blade holder 138 as a tip tool holder. The slider 6 has its front end protruding from the front end of the power transmission housing 20.

The slider body 136 is cylindrical and extends in the front-rear direction. The slider body 136 has a convex roller receiver 140 in its rear portion. The convex roller receiver 140 is a bottomed elliptical cylinder extending laterally. The convex roller receiver 140 is open downward. The convex roller receiver 140 receives the convex roller 124.

In response to rotation of the crank cam 108, the convex roller 124 rotates eccentrically. The motion of the convex roller 124 includes a front-rear component that causes the slider body 136 to reciprocate in the front-rear direction through the convex roller receiver 140. The lateral component of the motion of the convex roller 124 is its relative motion within the convex roller receiver 140, and is not transmitted to the slider body 136.

The blade holder 138 holds a blade (not shown) as a tip tool. The blade holder 138 automatically holds a blade in response to the rear end of the blade being simply inserted into the blade holder 138 (quick attachment).

The blade holder 138 is larger than the slider body 136 in the vertical and lateral directions. The slider 6 is an output section. The blade is a tip tool. The blade is an elongated plate and extends in the front-rear direction when attached. The blade has an edge on a longer side. The edge includes saw teeth. The blade is attached with its edge facing downward. The blade may be attached with its edge facing upward. The blade may have edges on the two longer sides. The tip tool may be any tool other than a blade.

A cam sleeve 141 is located on the outer periphery of the blade holder 138. The cam sleeve 141 is rotatable about the central axis of the blade holder 138 in the front-rear direction relative to the other portion of the blade holder 138. The cam sleeve 141 includes a projection 142. The projection 142 projects radially outward from the other portion of the blade holder 138. With the blade holder 138 receiving a blade, the cam sleeve 141 is rotated clockwise as viewed from the front. This detaches the blade.

The guide shoe unit 8 is located adjacent to the blade attached to the blade holder 138.

The counterweight 9 is combined with the reciprocation converter 5.

The counterweight 9 includes a metal balancer 144 and a ring 145.

The balancer 144 is a plate extending in the front-rear and lateral directions. The balancer 144 has a long hole 146 extending laterally in a middle portion. The portion of the balancer 144 frontward from the long hole 146 is heavier than the portion rearward from the long hole 146.

The long hole 146 in the balancer 144 receives the coupler 127 in the crank cam 108 with the ring 145.

The portion of the balancer 144 frontward from the long hole 146 has a slit 147 extending in the front-rear direction. The slit 147 receives a rod 148. The rod 148 extends vertically. The lower portion of the rod 148 is held on the lower power transmission housing 20b.

The portion of the balancer 144 rearward from the long hole 146 has a recess 149 on its bottom. The recess 149 is recessed upward from its surrounding portion. The recess 149 does not come in contact with a rear upper portion X of the lower power transmission housing 20b (refer to FIG. 3).

The balancer 144 reciprocates in the front-rear direction as the crank cam 108 rotates. The coupler 127 is located opposite to the convex roller 124 from the center of the crank cam body 120. More specifically, the coupler 127 and the convex roller 124 are at an angle of about 175° to each other about the center of the crank cam body 120 in the front-rear and lateral directions. The portion of the balancer 144 frontward from the long hole 146 thus basically moves opposite to the movement of the slider 6 in the front-rear direction. The balancer 144 thus reduces the vibrations generated by the reciprocation of the slider 6. More specifically, the balancer 144 moves in the direction opposite to the backward and forward motion of the slider 6, and thus serves as a counterweight. The lateral component in the motion of the coupler 127 is its relative motion within the long hole 146, and is not transmitted to the balancer 144. The angle between the coupler 127 and the convex roller 124 may be 180° or any other angle.

The orbital unit 12 includes a slider support body 150, multiple (two) oilless bearings 151 as slider supports, multiple (two) plates 152, a slider support shaft 153, multiple springs 154 as elastic members, a bearing 156, and multiple screws 160.

The slider support body 150, the oilless bearings 151, the plates 152, the bearing 156, and the screws 160 are included in a cylindrical slider support 161. The bearing 156 and other components may be eliminated from the components of the slider support 161. At least one of the slider support shaft 153 or the springs 154 may be included in the components of the slider support 161.

The slider support body 150 is a metal box extending in the front-rear direction.

The slider support body 150 holds the oilless bearings 151 on its front and rear portions. The oilless bearings 151 each have a square cross section.

The slider 6 extends through the oilless bearings 151 in a reciprocable manner.

The slider support body 150 has an opening in its lower middle portion, where the convex roller 124 and the convex roller receiver 140 can be located. The oilless bearings 151 are located in front of and behind the opening.

A rear plate 152 is fastened to a lower rear portion of the slider support body 150 below a rear oilless bearing 151 with multiple (two, or right and left) screws 160 extending vertically. The rear plate 152 is formed from metal, and extends in the front-rear and lateral directions. The slider support body 150 holds the rear oilless bearing 151 from above. The rear plate 152 holds the rear oilless bearing 151 from below.

A front plate 152 is fastened to a lower front portion of the slider support body 150 below a front oilless bearing 151 with multiple (two, or right and left) screws 160 extending vertically. The front plate 152 is formed from metal, and extends in the front-rear and lateral directions. The slider support body 150 holds the front oilless bearing 151 from above. The front plate 152 holds the front oilless bearing 151 from below.

The plates 152 and the screws 160 may be eliminated.

The slider support body 150 has right and left shaft holes 162 extending laterally on its front bottom. The peripheries of the shaft holes 162 are fixed to the upper power transmission housing 20a.

The slider support shaft 153 extends through the right and left shaft holes 162. The slider support 161 is pivotable about the slider support shaft 153.

The springs 154 are located on the right and left of the rear top of the slider support body 150. The springs 154 extend vertically. The upper end of each spring 154 is held on the rear inner surface of the upper power transmission housing 20a.

The bearing 156 is located behind the lower opening in the slider support body 150 and in front of the plate 152. The bearing 156 is a ball bearing.

The inner ring of the bearing 156 is held on the outer surface of the oilless bearing 151. The outer ring of the bearing 156 can be in contact with the cam surface 130a in the crank cam 108.

The orbital switcher 14 includes an orbital switching lever 170 as an orbital switch.

The orbital switching lever 170 includes a lever body 172 as a shaft and the knob 174.

The lever body 172 is a rod extending laterally.

The orbital switching lever 170 is held on the upper power transmission housing 20a in a manner rotatable about a central axis C (refer to FIGS. 7 and 8) of the lever body 172. The central axis C of the lever body 172 is parallel to the plate 152 to be in contact with the lever body 172.

The lever body 172 has a first flat surface 176 and a second flat surface 178. The first flat surface 176 is a support surface extending laterally. The second flat surface 178 is a surface for a second orbital mode extending laterally. The first flat surface 176 and the second flat surface 178 are at a predetermined angle (about 100° in this example) to each other. The distance from the central axis C to the first flat surface 176 is larger than the distance from the central axis C to the second flat surface 178.

In a first state of orbital (first orbital mode) as in FIG. 7, the first flat surface 176 can be in contact with the rear bottom (rear plate 152) of the slider support 161. When the orbital switching lever 170 is in contact with the plate 152, the first flat surface 176 extends, in the front-rear direction, on both sides of a perpendicular plane V (vertical plane, refer to FIG. 7) including the central axis C and perpendicular to the first flat surface 176. More specifically, the first flat surface 176 extends through the perpendicular plane V. In other words, the first flat surface 176 has a first portion 176a frontward from the central axis C (perpendicular plane V) and a second portion 176b rearward from the central axis C (perpendicular plane V). FIG. 4 is a cross-sectional view taken along the perpendicular plane V.

In a second state of orbital (second orbital mode) as in FIG. 8, the second flat surface 178 faces the rear bottom of the slider support 161 across a space. In this case, the bearing 156 in the orbital unit 12 comes in contact with the cam surface 130a of the cam 130 along the entire circumference of the cam surface 130a.

In the second orbital mode, the bearing 156 comes in contact with the lowest point 130a1 on the cam surface 130a of the cam 130 (refer to FIG. 8) under a downward urging force from the springs 154. The second flat surface 178 of the lever body 172 remains separate from the rear bottom of the slider support 161 in this state. This causes the slider support 161, the slider 6, and the blade to face upward (toward the front). The bearing 156 also comes in contact with the highest point 130a2 on the cam surface 130a. The bearing 156 is then pushed upward by the cam surface 130a against the urging force from the springs 154, causing the slider support 161, the slider 6, and the blade to face downward (toward the front). The height of the portion of the cam surface 130a between the lowest point 130a1 and the highest point 130a2 in the circumferential direction changes gradually. Thus, rotation of the crank cam 108 moves the bearing 156 up and down as the bearing 156 travels relatively on the cam surface 130a. The slider support 161, the slider 6, and the blade thus repeatedly face upward toward the front, align with the front-rear direction, face downward toward the front, and align in the front-rear direction. This causes an elliptical orbital action of the blade holder 138.

Orbital action is associated with the reciprocation of the slider 6 in accordance with the circumferential distribution of the height of the cam surface 130a in the crank cam 108.

When moving forward, the slider 6 faces upward toward the front. When switching the moving direction from forward to backward (or passing near the switching point), the slider 6 aligns with the front-rear direction. When moving backward, the slider 6 faces downward toward the front. When switching the moving direction from backward to forward (or passing near the switching point), the slider 6 aligns with the front-rear direction.

With the slider support 161 and the slider 6 facing either upward or downward, the convex roller 124 allows reciprocation of the slider 6 appropriately.

In the first orbital mode, the rear portion of the slider support 161 is lifted by the first flat surface 176 of the lever body 172. The bearing 156 thus does not come in contact with the lowest point 130a1 and the adjacent portion on the cam surface 130a. The slider 6 thus faces less upward toward the front than in the second orbital mode. In contrast, the bearing 156 comes in contact with the highest point 130a2 and the adjacent portions on the cam surface 130a.

The bearing 156 comes in contact with the cam 130 on about half the cam 130 and does not come in contact with the cam 130 on the other half due to the first flat surface 176 of the lever body 172. Thus, when moving backward, the slider 6 aligning with the front-rear direction faces downward toward the front, and then aligns again with the front-rear direction. This causes the semielliptical orbital action of the blade holder 138 in the same manner as in the second orbital mode. When moving forward, the slider 6 remains mostly in alignment with the front-rear direction. In the first orbital mode, the blade holder 138 thus performs semi-elliptical orbital action.

In the first orbital mode, the blade holder 138 performs orbital action in a range of about half the rotation (first range). In the second orbital mode, the blade holder 138 performs orbital action throughout the rotation range (second range), which is wider than the range of about half the rotation (first range).

In the first orbital mode, no orbital action may be performed throughout the rotation range. For example, elliptical orbital action may be performed on one-quarter of the rotation and may not be performed on the remaining three-quarters of the rotation. The range in which orbital action is performed (the on-off ratio of orbital action) may be changed in this manner.

Similarly, in the second orbital mode, orbital action may not be performed in a part of the rotation range. More specifically, the range in which orbital action is performed may be changed variously with the range of orbital action in the first orbital mode (first range) being smaller than the range of orbital action in the second orbital mode (second range).

The knob 174 crosses the lever body 172. The knob 174 in the present embodiment crosses the lever body 172 orthogonally.

The knob 174 is located on the left of the power transmission housing 20 and the cover 22. The knob 174 is exposed outside. The knob 174 is received in the orbital switching lever hole 58 in the cover 22.

The user operates the knob 174 to rotate the orbital switching lever 170 on the central axis C to switch between the orbital modes.

FIG. 9 is a perspective view of a front portion of the reciprocating saw 1 as viewed from the upper right front. In FIG. 9, a shoe 229 (described later) in the guide shoe unit 8 is not shown.

A clearance is left between a left portion of the power transmission housing 20 and a left portion of the cover 22 to allow passage of a cooling outlet blow WL from the fan 4. The outlet blow WL exits through the left body outlets 56 (FIG. 1).

Similarly, a clearance is left between a right portion of the power transmission housing 20 and a right portion of the cover 22 to allow passage of a cooling outlet blow WR from the fan 4. The outlet blow WR exits through the right body outlets 56 (FIG. 9).

A ridge portion 180 is located on the top of the upper power transmission housing 20a. The ridge portion 180 includes a pair of ridges extending in the front-rear direction. The ridge portion 180 includes a pair of walls protruding upward from the adjacent portions. The front end of the ridge portion 180 receives a housing 180a for the lamp 62. A lead wire connecting the lamp 62 to the control circuit board 42 extends through the ridge portion 180. The ridge portion 180 houses the lead wire for the lamp 62.

The upper end of the ridge portion 180 is in contact with the upper inner surface of the cover 22. Clearances 181L and 181R, each as a first passage on the right or left of the ridge portion 180, are left between the upper portion of the upper power transmission housing 20a and the upper portion of the cover 22. The clearances 181L and 181R allow passage of an outlet blow W1 from the fan 4. Although FIGS. 2 and 3 show the outlet blow W1 overlapping the ridge portion 180 for ease of explanation, the outlet blow W1 mostly flows through the clearances 181L and 181R.

The first passage for the outlet blow may not separate into right and left passages or may separate into three or more passage.

The upper power transmission housing 20a has a front wall 184 extending vertically and laterally in its front portion. The front wall 184 is in front of the slider support 161. The front wall 184 has a hole receiving the slider body 136 through the front wall 184.

The upper power transmission housing 20a has a wall 186 in front of the front wall 184. The wall 186 protrudes from the upper inner surface of the upper power transmission housing 20a downward from the adjacent portion. The wall 186 is a semicircular arc strip as viewed from the rear and surrounds the slider 6.

The upper power transmission housing 20a has a left hole 188L and a right hole 188R between the front wall 184 and the wall 186. The left hole 188L is on the left of the ridge portion 180. The right hole 188R is on the right of the ridge portion 180.

The outlet blow W1 passing through the clearance 181L enters the left hole 188L from above and flows forward until reaching in front of the left hole 188L. Without the wall 186, the outlet blow W1 entering the left hole 188L flows toward the blade holder 138 (refer to an outlet blow W2). Similarly, the outlet blow W1 passing through the clearance 181R enters the right hole 188R from above and flows forward until reaching in front of the right hole 188R. Without the wall 186, the outlet blow W1 entering the right hole 188R flows toward the blade holder 138.

In the reciprocating saw 1, the wall 186 separates the outlet blow W1 into the outlet blow W2 that flows toward the blade holder 138 and an outlet blow W3 that does not flow toward the blade holder 138. More specifically, the clearances 181L and 181R each as the first passage branch into a second passage 192 and a third passage 193 between the front wall 184 and the wall 186. The second passage 192 extends toward the blade holder 138 and extends frontward from the portion between the wall 186 and the slider 6. The third passage 193 extends downward from the portion between the front wall 184 and the wall 186.

The left hole 188L and the right hole 188R may not be separate right and left holes or may be separate three or more holes.

The lower power transmission housing 20b includes a lower wall 196 vertically symmetrical with the wall 186. The lower wall 196 is a circular arc strip protruding upward from the lower inner surface of the lower power transmission housing 20b. The upper end of the lower wall 196 is continuous and in contact with the lower end of the wall 186.

The lower portion of the lower power transmission housing 20b has a lower front outlet 198 (FIG. 10) as a lower outlet behind the lower wall 196. The lower portion of the front wall 184 of the upper power transmission housing 20a is located behind the lower front outlet 198.

Figure 10:
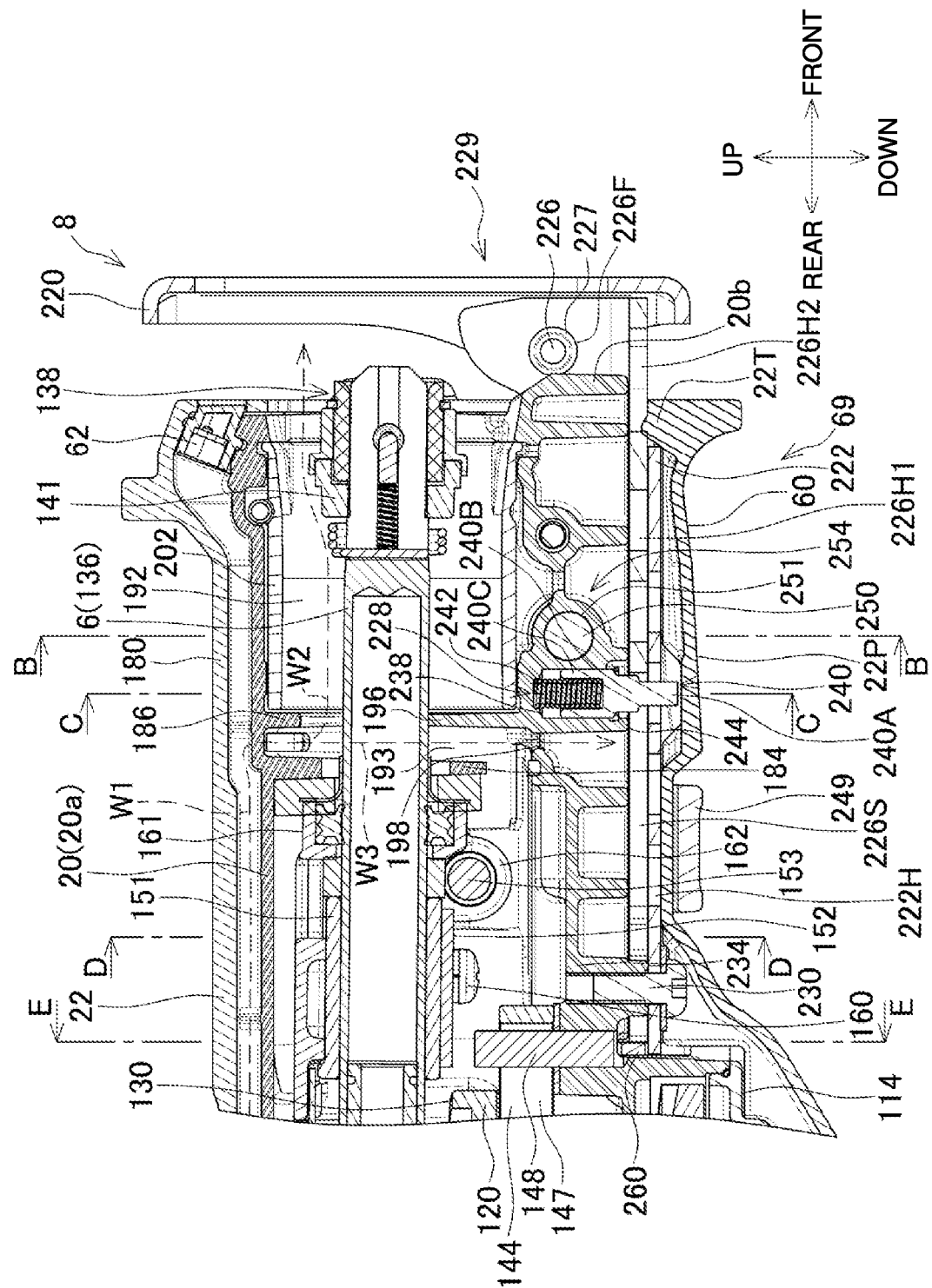
FIG. 10 is a partially enlarged view of a front portion of the reciprocating saw in FIG. 2.

The space between the lower wall 196 and the slider 6, together with the space between the wall 186 and the slider 6, defines the second passage 192 (FIG. 10).

The space behind the lower wall 196, together with the space between the front wall 184 and the wall 186, defines the third passage 193 (FIG. 10). The third passage 193 extends to the lower front outlet 198. The outlet blow W3 flows from the lower front outlet 198 through a clearance in the guide shoe unit 8 to the lower inner surface of the cover 22. The outlet blow W3 is then directed forward to exit through a portion below the blade holder 138 (around the base of the guide shoe unit 8).

The release unit 201 is housed in the power transmission housing 20 in front of the wall 186 and the lower wall 196.

The release unit 201 acts on the blade holder 138 for detachment of the blade.

The release unit 201 includes a release drum 202 and a tension spring 203.

The release drum 202 is cylindrical and is housed in the power transmission housing 20. The wall 186 restricts the backward movement of the release drum 202. The release drum 202 is adjacent to the blade holder 138. The release drum 202 surrounds the cam sleeve 141. The release drum 202 is an operation drum operable by the user to detach (release) the blade from the blade holder 138.

The release drum 202 includes an inward-raised portion 204 and an operation tab 206.

The inward-raised portion 204 is located on the inner surface of the release drum 202. The inward-raised portion 204 is raised radially inward from the other portion of the inner surface of the release drum 202. The inward-raised portion 204 is located on the right of the release drum 202.

The operation tab 206 is located on the right of the release drum 202. The operation tab 206 protrudes radially outward from the other portion of the outer surface. The operation tab 206 extends from the upper left to the lower right as indicated by the solid line in the figure, and has a width in the front-rear direction. The operation tab 206 is integral with other parts of the release drum 202 (the cylindrical body of the release drum). The operation tab 206 protrudes rightward through a first operation tab hole 212 in the power transmission housing 20 and a second operation tab hole 214 in the cover 22.

The tension spring 203 is a coil spring. The tension spring 203 is located circumferentially outside the release drum 202 and extends circumferentially on the release drum 202. The tension spring 203 is housed in the power transmission housing 20.

The tension spring 203 has a hook-shaped first end to be engaged with the release drum 202.

The tension spring 203 has a hook-shaped second end fixed to the lower power transmission housing 20b.

With the tension spring 203 slightly stretched from its equilibrium length, the inward-raised portion 204 on the release drum 202 is not in contact with the projection 142 on the cam sleeve 141 in a blade holding state. In this state, the operation tab 206 on the release drum 202 is in contact with the lower ends of the first operation tab hole 212 and the second operation tab hole 214. In this state, the tension spring 203 may be in other states, such as the state having the equilibrium length.

The user operates the operation tab 206 at the lower position upward to rotate the release drum 202 on its axis extending in the front-rear direction against an urging force from the tension spring 203. This causes the inward-raised portions 204 to come in contact with the corresponding projections 142 on the cam sleeve 141 and rotate the cam sleeve 141 clockwise as viewed from the front. This releases the blade held by the blade holder 138. The released blade is pushed forward by the blade holder 138.

The release drum 202 in the release unit 201 cooperates with the internal blade holder 138, causing the blade to be released from the blade holder 138 in response to the upward operation performed on the operation tab 206.

The operation drum may be used to attach the blade instead of or in addition to releasing the blade.

The outlet blow W2 toward the blade holder 138 flows between the release drum 202 and the slider 6 forward to the outside.

Figure 11:
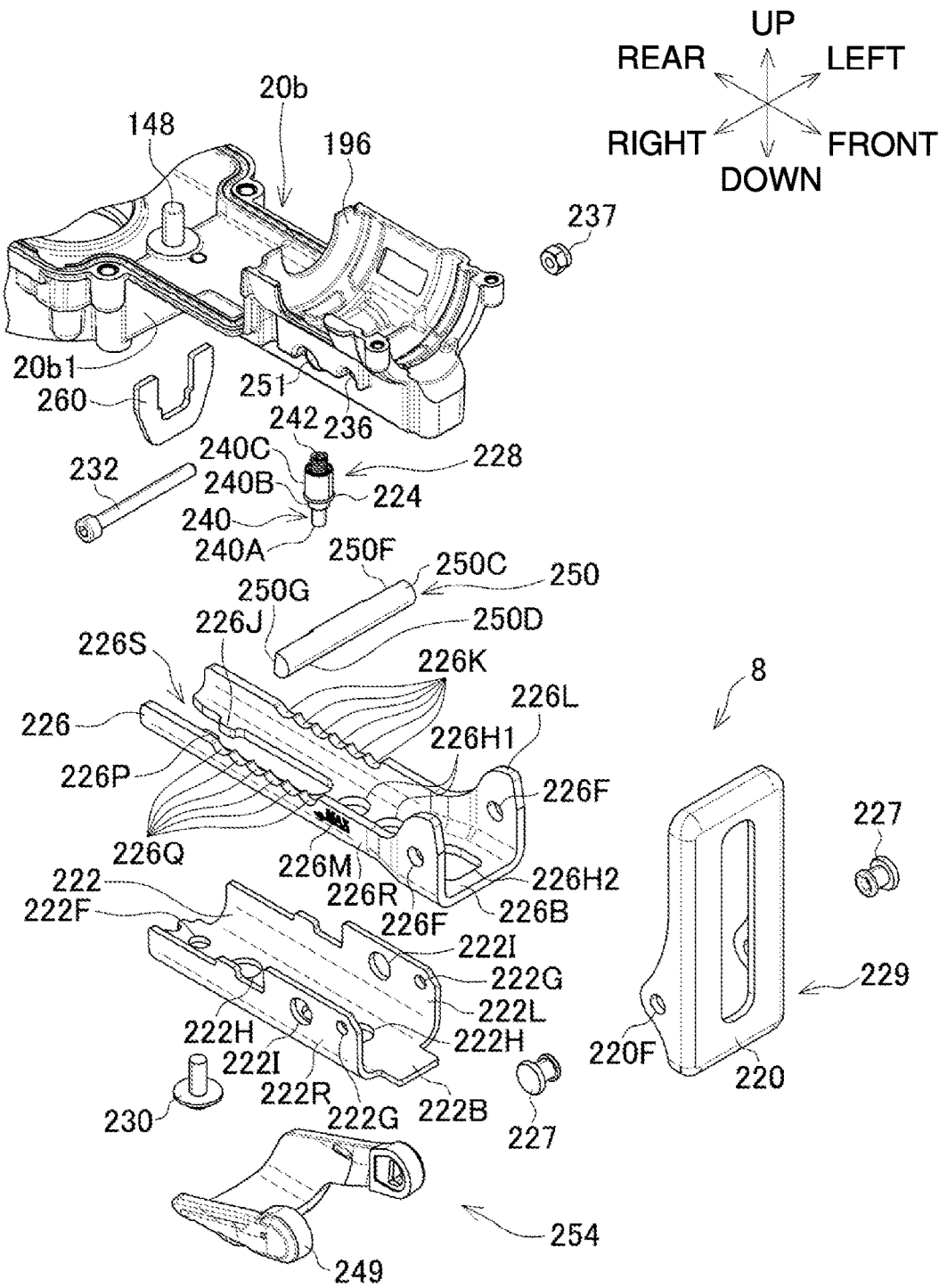
FIG. 11 is a partially exploded perspective view of a guide shoe unit in FIG. 2 and its surrounding components as viewed from above.
Figure 12:
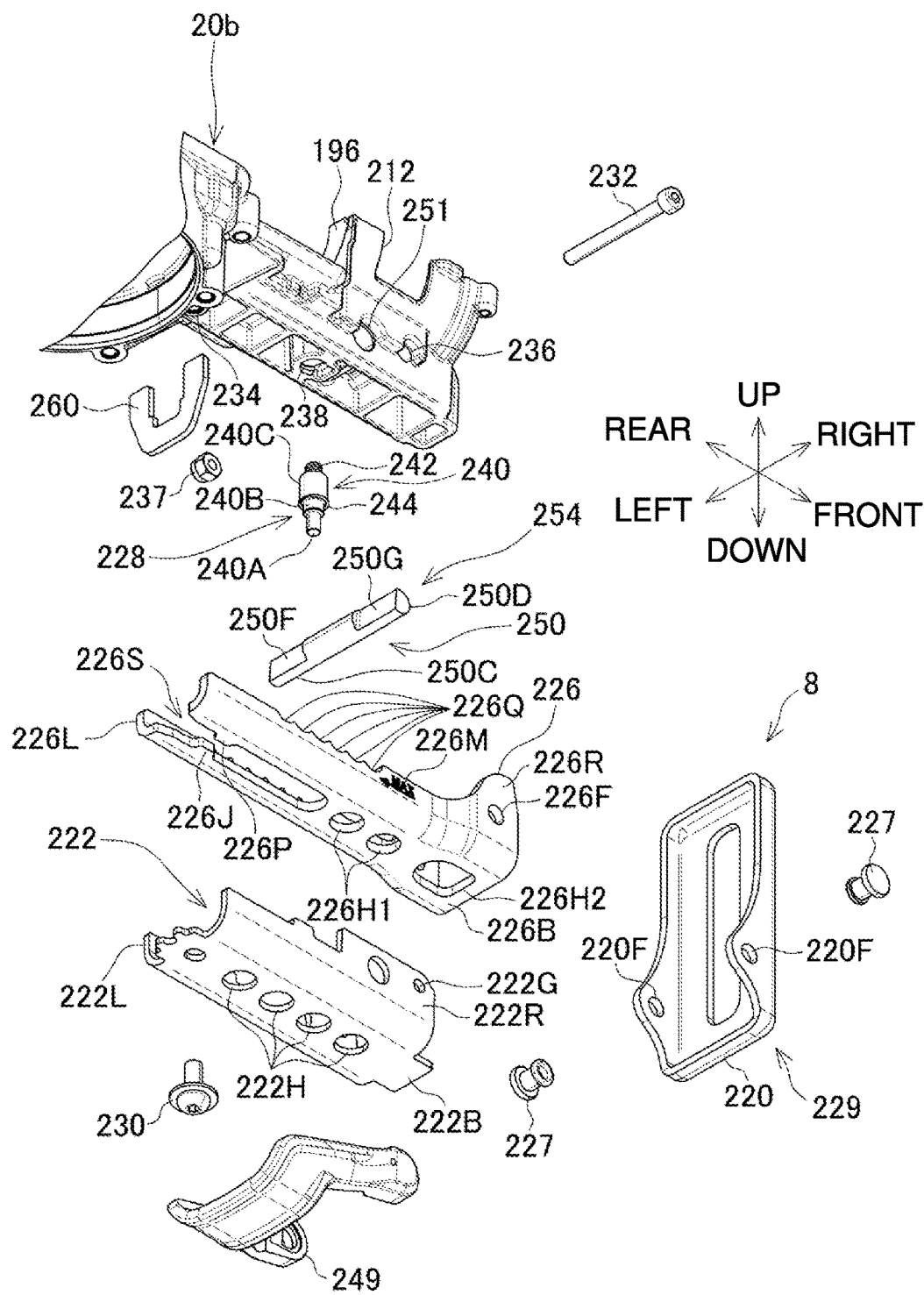
FIG. 12 is a partially exploded perspective view of the guide shoe unit in FIG. 2 and its surrounding components as viewed from below.
Figure 15:
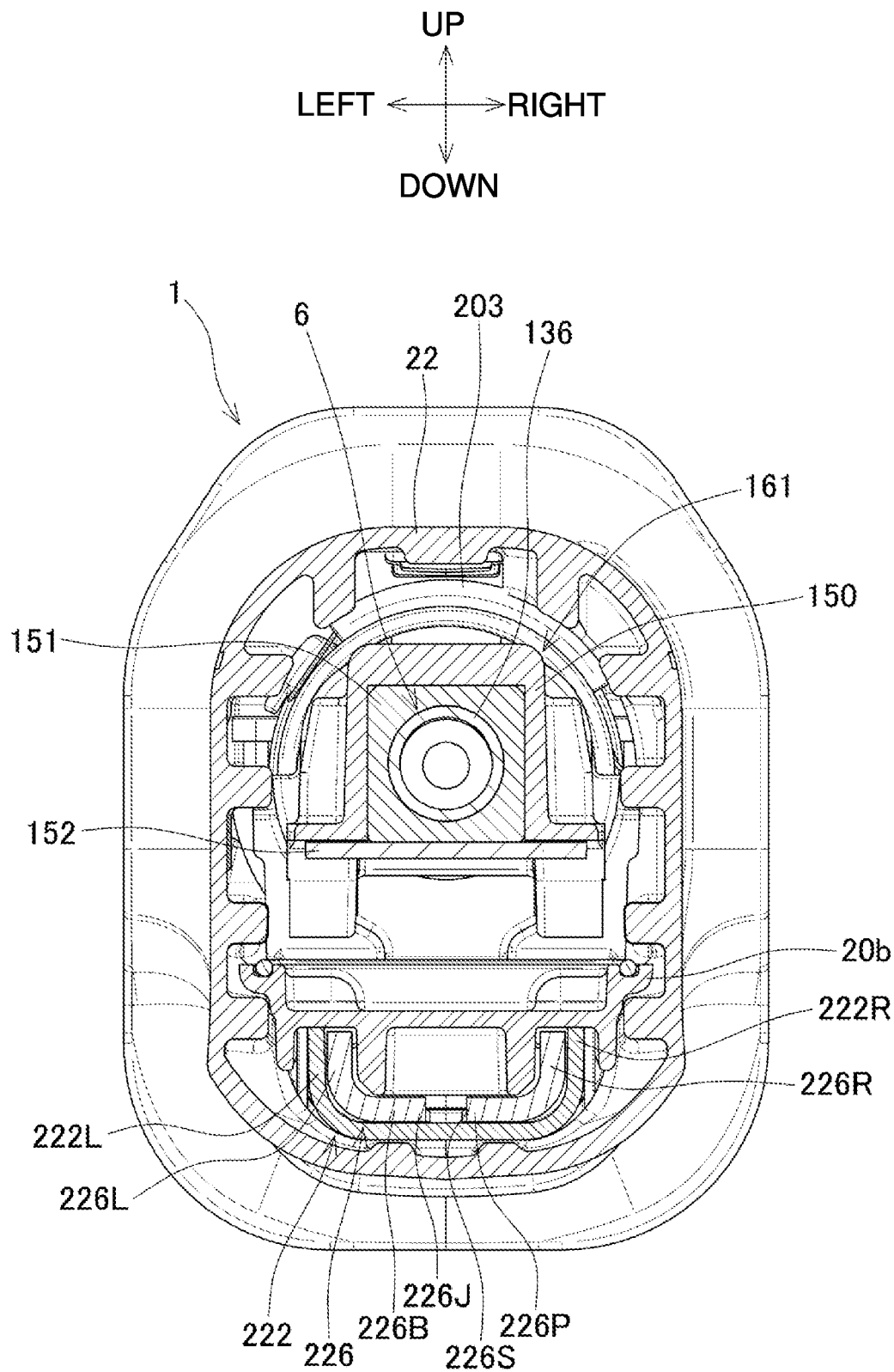
FIG. 15 is a cross-sectional view taken along line D-D in FIG. 10.
Figure 16:
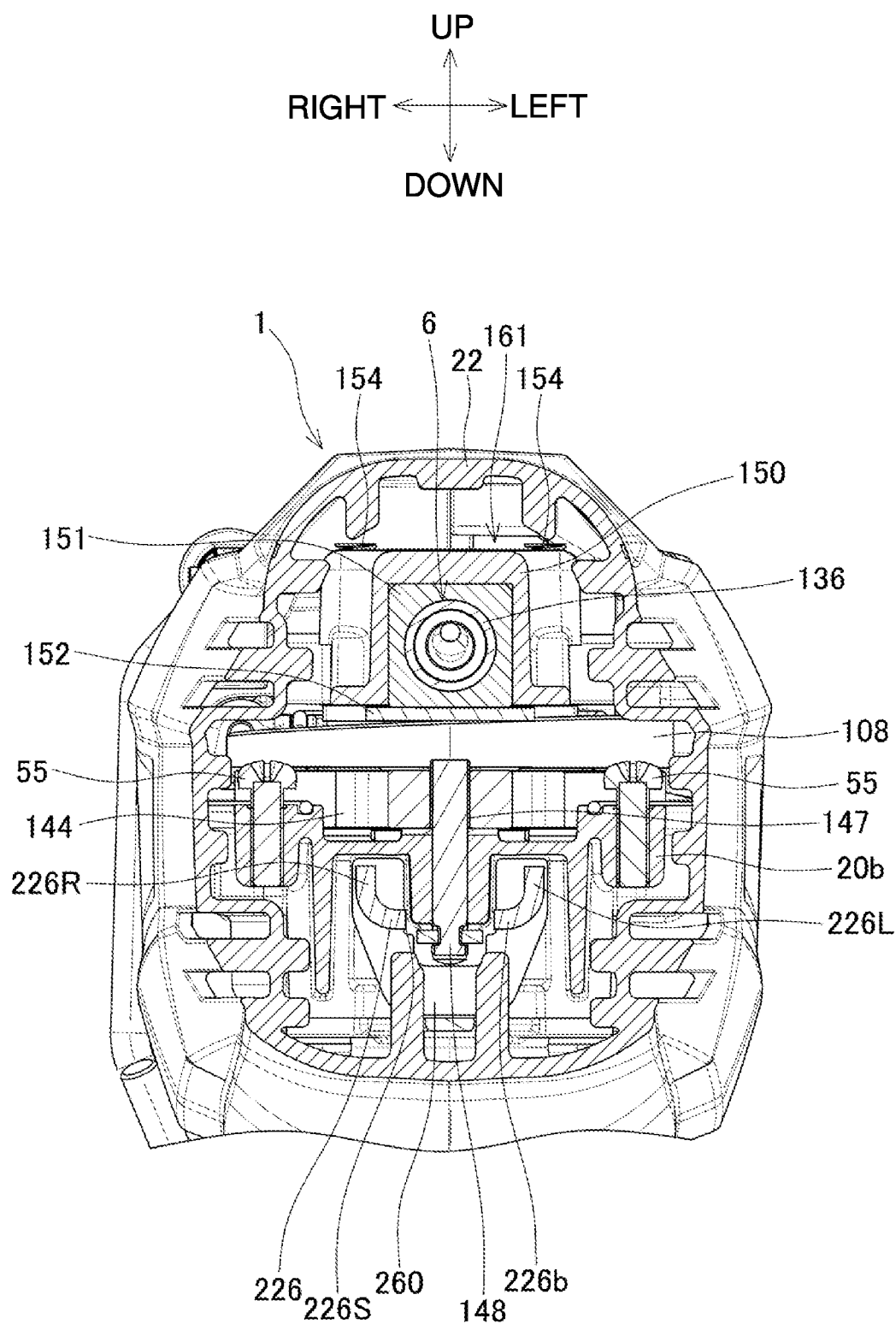
FIG. 16 is a cross-sectional view taken along line E-E in FIG. 10.

FIG. 10 is a partially enlarged view of a front portion of the reciprocating saw 1 in FIG. 2. FIG. 11 is a partially exploded perspective view of the guide shoe unit 8 in FIG. 2 and its surrounding components as viewed from above. FIG. 12 is a partially exploded perspective view of the guide shoe unit 8 in FIG. 2 and its surrounding components as viewed from below. FIG. 13 is a cross-sectional view taken along line B-B in FIG. 10. FIG. 14 is a cross-sectional view taken along line C-C in FIG. 10. FIG. 15 is a cross-sectional view taken along line D-D in FIG. 10. FIG. 16 is a cross-sectional view taken along line E-E in FIG. 10.

The guide shoe unit 8 is located in front of and under the slider 6.

The guide shoe unit 8 includes a shoe plate 220, a shoe guide plate 222, a shoe support 226, multiple (two) shafts 227, a pin unit 228, a lock lever 249, and a shoe support engagement shaft 250.

The shoe plate 220, the shoe support 226, and the shafts 227 are included in the shoe 229. The shoe plate 220 is formed from metal such as iron. The shoe plate 220 has a front surface to come in contact with a workpiece. The shoe plate 220 has shaft holes 220F extending laterally in its lower left and right portions.

The shoe guide plate 222 is formed from metal such as iron. The shoe guide plate 222 is fastened to the lower portion of the lower power transmission housing 20*b* with a screw 230 extending vertically and a screw 232 extending laterally. The screw 230 is received in a screw boss 234 in the lower power transmission housing 20*b*. The screw 232 is placed through a screw hole 236 extending laterally in the lower power transmission housing 20*b*. The screw 232 receives a nut 237 on its left end. The shoe guide plate 222 is located between the front lower outer surface of the lower power transmission housing 20*b* and the front lower inner surface of the cover 22.

The shoe guide plate 222 has a U-shaped cross section. The shoe guide plate 222 includes a bottom plate 222B, a left wall 222L, and a right wall 222R. The left wall 222L and the right wall 222R stand from the left and right sides of the bottom plate 222B.

The shoe guide plate 222 has a screw hole 222F, multiple (two) screw holes 222G, multiple (four) holes 222H, and multiple (two) holes 222I. The screw hole 222F is at the rear end of the bottom plate 222B. The screw hole 222F receives the screw 230. The screw holes 222G are at the front ends of the left wall 222L and the right wall 222R. The screw holes 222G receive the screw 232. The screw 232 is located above the shoe support 226. The holes 222H are arranged in the bottom plate 222B at equal intervals in the front-rear direction. The holes 222I are rearward from the screw hole 222G in the left wall 222L and rearward from the screw hole 222G in the right wall 222R.

The body housing 2 does not include the shoe guide plate 222. In some embodiments, the body housing 2 may include the shoe guide plate 222.

The shoe support 226 is formed from metal such as iron. The shoe support 226 is received inside the shoe guide plate 222. The shoe support 226 is slidable in the front-rear direction inside the shoe guide plate 222. The shoe support 226 is located between the front lower outer surface of the lower power transmission housing 20*b* and the front lower inner surface of the shoe guide plate 222. The shoe guide plate 222 guides the shoe support 226 (to slide).

The shoe support 226 has a U-shaped cross section. The shoe support 226 includes a bottom plate 226B, a left wall 226L, and a right wall 226R. The left wall 226L and the right wall 226R stand from the left and right sides of the bottom plate 226B. The shoe support 226 with this structure is more robust.

The shoe support 226 has multiple (two) shaft holes 226F, multiple (six) left receiving portions 226K, multiple (six) right receiving portions 226Q, multiple (two) holes 226H1, one hole 226H2, and a slit portion 226S extending in the front-rear direction. The shaft holes 226F are at the front ends of the left wall 226L and the right wall 226R. The left receiving portions 226K each are an arc-shaped downward recess in a middle portion of the upper side of the left wall 226L. The left receiving portions 226K are arranged in the front-rear direction. The right receiving portions 226Q each are an arc-shaped downward recess in a middle portion of the upper side of the right wall 226R. The right receiving portions 226Q are arranged in the front-rear direction. The holes 226H1 and 226H2 are arranged in the bottom plate 226B in the front-rear direction. The holes 226H1 and 226H2 reduce the weight of the shoe support 226.

The slit portion 226S extends frontward from the rear end of the bottom plate 226B. The slit portion 226S has a left protrusion 226J at its left rear edge. The left protrusion 226J protrudes rightward from the left edge of the slit portion 226S. The slit portion 226S has a right protrusion 226P at its right rear edge. The right protrusion 226P protrudes leftward from the right edge of the slit portion 226S. The left protrusion 226J and the right protrusion 226P face each other at a distance shorter than the width of the slit, which is the width (a dimension in the lateral direction) of the other portion of the slit portion 226S. The clearance between the left protrusion 226J and the right protrusion 226P serves as a slit narrowing portion with a narrower width of the slit portion 226S. Either the left protrusion 226J or the right protrusion 226P may be eliminated.

The shoe guide plate 222 does not extend to the front end of the cover 22. The shoe support 226 is thus in contact with a contact 22T on a lower inner surface of the front end of the cover 22. The contact 22T is raised radially inward (upward) from the other portion of the inner front surface of the cover 22.

A raised portion 22P is located in a lower portion of the cover 22 below a middle portion of the shoe guide plate 222. The raised portion 22P protrudes downward relative to a rear portion of the shoe guide plate 222. The raised portion 22P is separate from the shoe guide plate 222 to define a space inside.

The lower power transmission housing 20*b* has a front lower portion having the same width as the distance between the left wall 226L and the right wall 226R of the shoe support 226. The lower power transmission housing 20*b* has multiple ribs on the bottom of the front lower portion. The ribs protrude downward from the other portion. The multiple ribs on the bottom of the front lower portion of the lower power transmission housing 20*b* define upward recesses between adjacent ribs.

When the shoe support 226 is at a rearmost position, or in other word, at the illustrated rearmost sliding position, the screw 230 and the screw boss 234 for fastening the shoe guide plate 222 are received in the slit portion 226S behind the left protrusion 226J and the right protrusion 226P.

The shafts 227 are placed on the right and left of the front end of the shoe support 226. Each shaft 227 supports the shoe plate 220 in a swingable manner on its axis extending in the lateral direction. The shaft 227 extends through the corresponding shaft hole 220F in the shoe plate 220 and the corresponding shaft hole 226F in the shoe support 226 that is located laterally inside the shoe plate 220.

The pin unit 228 includes a pin 240, a compression spring 242, which is an elastic member, and a ring spring 244, which is an elastic member.

The pin unit 228 is received in a recess 238 on the lower surface of a lower front portion of the power transmission housing 20*b*. The recess 238 is cylindrical and has an upper bottom.

The pin 240 extends vertically. The pin 240 includes a smaller-diameter portion 240A, a larger-diameter portion 240B, and a cylindrical portion 240C.

The smaller-diameter portion 240A is cylindrical and is at the lower end. The smaller-diameter portion 240A has a diameter smaller than the distance between the left protrusion 226J and the right protrusion 226P.

The larger-diameter portion 240B is cylindrical. The larger-diameter portion 240B has a larger diameter than the smaller-diameter portion 240A. The larger-diameter portion 240B has a diameter larger than the distance between the left protrusion 226J and the right protrusion 226P. The larger-diameter portion 240B is above the smaller-diameter portion 240A. The larger-diameter portion 240B is concentric with the smaller-diameter portion 240A.

The cylindrical portion 240C is above the larger-diameter portion 240B. The cylindrical portion 240C has a larger diameter than the larger-diameter portion 240B. The cylindrical portion 240C is concentric with the smaller-diameter portion 240A and the larger-diameter portion 240B.

The compression spring 242 is a cylindrical helical spring. The compression spring 242 is received in the cylindrical portion 240C. The compression spring 242 is concentric with the smaller-diameter portion 240A, the larger-diameter portion 240B, and the cylindrical portion 240C.

The compression spring 242 has its lower end in contact with a lower bottom of the cylindrical portion 240C. The compression spring 242 has its upper end in contact with an upper bottom of the recess 238.

The compression spring 242 urges the pin 240 downward.

With the compression spring 242 in a non-operating state in which the compression spring 242 has an equilibrium length or a length close to an equilibrium length, the lower end of the pin 240 is adjacent to the upper surface of the raised portion 22P. The smaller-diameter portion 240A extends through the hole 222H in the shoe guide plate 222. The larger-diameter portion 240B is received in the slit portion 226S in the shoe support 226. With the shoe 229 at the rearmost sliding position, the pin 240 is received in the front end of the slit portion 226S, with the shoe 229 and the pin 240 arranged in a space efficient manner. In this state, the shoe support 226 is at the rearmost in the slidable range inside the body 69 of the reciprocating saw 1. The slidable range of the shoe 229 is the movable range of the shoe 229 for locking in the front-rear direction.

The ring spring 244 fastens the pin 240 to the lower power transmission housing 20b. The ring spring 244 is located radially outside the pin 240. The ring spring 244 is at the upper end of the larger-diameter portion 240B of the pin 240.

The ring spring 244 engages with an inner surface of the recess 238 on the lower power transmission housing 20b. The pin unit 228 is thus less likely to separate from the recess 238.

The lock lever 249 is located outside the shoe guide plate 222. The lock lever 249 locks or unlocks the shoe 229. The lock lever 249 is U-shaped and is open frontward at a closed position as viewed from above.

The shoe support engagement shaft 250 extending laterally is connected to the lock lever 249. The shoe support engagement shaft 250 extends above the shoe support 226. The lock lever 249 is rotatable about the shoe support engagement shaft 250 together with the shoe support engagement shaft 250. The lock lever 249 is operable to be open and closed with respect to the cover 22.

The shoe support engagement shaft 250 extends through a hole 251 extending laterally in the lower power transmission housing 20b. The pin unit 228 and the recess 238 are located behind the hole 251.

The shoe support engagement shaft 250 extends through the holes 222I in the shoe guide plate 222.

The shoe support engagement shaft 250 has its left and right ends each with a D-shaped cross section. In other words, the shoe support engagement shaft 250 is cylindrical and has a left flat surface 250F, a right flat surface 250G, a left cylindrical surface 250C, and a right cylindrical surface 250D. The left cylindrical surface 250C connects to the left flat surface 250F. The right cylindrical surface 250D connects to the right flat surface 250G.

With the lock lever 249 at the closed position, or in other words, in contact with the cover 22 as shown in the figure, the shoe support engagement shaft 250 fastens the shoe 229. More specifically, the left cylindrical surface 250C of the shoe support engagement shaft 250 is received in any of the left receiving portions 226K of the shoe support 226. The right cylindrical surface 250D is also received in the right receiving portion 226Q that corresponds to the left receiving portion 226K in the front-rear direction. This causes the shoe support engagement shaft 250 to be engaged with the shoe support 226 and restricts the shoe 229 from sliding.

With the lock lever 249 at an open position, the shoe 229 fastened with the shoe support engagement shaft 250 is released. More specifically, the left cylindrical surface 250C of the shoe support engagement shaft 250 that has rotated with the lock lever 249 comes out of the left receiving portion 226K. The right cylindrical surface 250D also comes out of the right receiving portion 226Q. This causes the shoe support engagement shaft 250 to separate from the shoe support 226, disengaging the shoe support 226 and allowing the shoe 229 to slide. The shoe 229 is thus slidable in the front-rear direction for positional adjustment. The left receiving portion 226K then faces the left flat surface 250F. The right receiving portion 226Q faces the right flat surface 250G.

When the lock lever 249 is closed after the position of the shoe 229 is adjusted, the left cylindrical surface 250C of the shoe support engagement shaft 250 is received in any of the left receiving portions 226K of the shoe support 226. The right cylindrical surface 250D is also received in the right receiving portion 226Q that corresponds to the left receiving portion 226K. This locks the shoe 229 at the adjusted position.

The lock lever 249 and the shoe support engagement shaft 250 are included in a shoe lock unit 254.

With the lock lever 249 at the open position, the shoe 229 moving forward causes the pin 240 in the pin unit 228 to move relatively backward in the slit portion 226S in the shoe support 226. When the shoe 229 moves forward by a predetermined degree in a non-operating state, the larger-diameter portion 240B of the pin 240 comes in contact with the left protrusion 226J and the right protrusion 226P and the pin 240 interferes with the shoe 229. The shoe 229 is thus restricted from moving forward beyond the predetermined degree (foremost sliding position) and is thus less likely to slip off.

The shoe support 226 includes multiple (two) marks 226M. Each mark 226M indicates the foremost sliding position. The marks 226M may be partially or entirely eliminated.

With the shoe 229 at the foremost sliding position, the shoe support 226 is at the foremost in the slidable range and is most largely out of the body 69 of the reciprocating saw 1.

When the pin 240 is pushed upward through the raised portion 22P on the cover 22 against an urging force from the compression spring 242, the larger-diameter portion 240B is positioned above the slit portion 226S to be out of the slit portion 226S, and the smaller-diameter portion 240A is received in the slit portion 226S.

With the shoe 229 moving further forward in this state, the smaller-diameter portion 240A moves between the left protrusion 226J and the right protrusion 226P. The shoe 229 is then disengaged without being caught by the pin 240 and detached from the other portion of the reciprocating saw 1.

The detached shoe 229 is attachable with the procedure reverse to the detachment procedure.

The pin operation unit for moving the pin 240 is not limited to the raised portion 22P. For example, the pin operation unit may be a recess that is recessed from the surrounding portion.

As shown in, for example, FIG. 16, a plate 260 is located behind the shoe support 226. The plate 260 is formed form metal harder than the lower power transmission housing 20b formed from an aluminum alloy, or more specifically, the plate 260 is formed form iron. The plate 260 extends vertically and laterally. The plate 260 is thick U-shaped and is open upward as viewed from the front.

The plate 260 is on the front of a surface 20b1 (FIG. 11) of the lower power transmission housing 20b. The surface 20b1 extends in the front-rear and lateral directions below the rod 148. The plate 260 is on the left and right of a mount for the rod 148 in the lower power transmission housing 20b, avoiding the rod 148 and the mount for the rod 148. The plate 260 is located behind the screw 230 and the screw boss 234. The plate 260 is accommodated between the lower power transmission housing 20b and the rear end of the shoe guide plate 222.

With the shoe 229 at the rearmost sliding position, the rear end of the shoe support 226 is not in contact with the plate 260. The plate 260 comes in contact with the shoe support 226 that has moved backward from the rearmost sliding position under an external force.

Unlike the reciprocating saw 1 according to the present embodiment, a reciprocating saw without the plate 260 may include an iron shoe support 226 directly in contact with the lower power transmission housing 20b that is less rigid and may deform the lower power transmission housing 20b. In contrast, the reciprocating saw 1 according to the present embodiment includes the plate 260 that accommodates an impact force from the shoe support 226, thus causing less deformation of the lower power transmission housing 20b.

Unlike the reciprocating saw 1 according to the present embodiment, the shoe support 226 may have stands bent at its rear end. The bent portions may be broken or damaged by an impact under a force of a predetermined degree or greater although the stands can reduce such an impact force. In contrast, the reciprocating saw 1 according to the present embodiment includes, separate from the shoe support 226, the plate 260 that reduces an impact force from the shoe support 226 for a longer period of time.

An example operation of the above reciprocating saw 1 will now be described.

The user attaches a blade to the blade holder 138 in the slider 6 in an off-state. Typically, the blade is applied onto a workpiece from above. The blade is thus attached with the edge (applied part) facing downward. The blade may be attached to face upward to, for example, apply the blade from below.

The user adjusts the length of the shoe 229 as appropriate to place the front face of the shoe plate 220 onto a workpiece. The user attaches the charged battery 54 to the battery mount 50. The user operates the speed setting dial 36 to select the speed.

The user then holds the first grip 30 (and the second grip 60) and pulls the trigger 33 by a predetermined amount. This turns on the switch body 34 and powers the motor 3 to rotate the motor shaft 80. The motor 3 operates on DC power rectified through the controller 40. The lamp 62 turns on in response to the trigger 33 pulled by an amount reaching or exceeding a specified amount. The specified amount is smaller than the predetermined amount set for the motor 3 to be powered.

A microcomputer in the controller 40 obtains information about the rotational state of the rotor 72 from the sensor board 75. The microcomputer in the controller 40 also controls the on-off state of each switching element in accordance with the obtained information about the rotational state, and sequentially applies a current through the coils 73 in the stator 71 to rotate the rotor 72. The controller 40 for the motor 3, which is a brushless motor, may typically generate heat when, for example, driving the microcomputer. The heat accumulating on the controller 40 may affect the operation of the controller 40.

The motor shaft 80 rotates at a rotational speed corresponding to a signal (the pulling amount of the trigger 33) from the switch body 34 in an on-state. The motor shaft 80 rotates at a higher rotational speed in correspondence with a larger pulling amount of the trigger 33. The highest rotational speed of the motor shaft 80 is controlled by the controller 40 in accordance with the rotational state of the speed setting dial 36.

In response to rotation of the motor shaft 80, the crank cam 108 rotates with the bevel gear 100, the torque limiter 102, the countershaft 104, and the crank base 106, causing the slider 6 to move backward and forward. The balancer 144 moves in the direction opposite to the slider 6 in the front-rear direction. The slider 6 thus moves backward and forward with reduced vibrations.

The slider 6 guided by the front and rear oilless bearings 151 is restricted from facing in any direction other than the direction of the slider support body 150.

When the user turns the knob 174 in the orbital switching lever 170 forward (refer to the two-dot chain line in FIG. 1), the second flat surface 178 of the lever body 172 aligns with the front-rear and lateral directions (refer to FIG. 8) and separates from the rear plate 152. The bearing 156 in the orbital unit 12 travels relatively on the entire circumference of the cam surface 130a on the crank cam 108, causing the slider support body 150 to pivot as the slider 6 reciprocates. This causes orbital action throughout the reciprocation of the slider 6 (second orbital mode).

When the user turns the knob 174 in the orbital switching lever 170 backward (refer to the solid line in FIG. 1), the first flat surface 176 of the lever body 172 aligns with the front-rear and lateral directions (refer to FIG. 7) and lifts the rear plate 152. The bearing 156 in the orbital unit 12 travels relatively on simply about half the circumference of the cam surface 130a on the crank cam 108, causing the slider support body 150 to pivot as the slider 6 reciprocates for the half circumference. The bearing 156 in the orbital unit 12 does not come in contact with the cam 130 for the remaining about half the circumference, maintaining the posture of the slider support body 150. This causes orbital action for about half the reciprocation of the slider 6 (first orbital mode).

As the user moves down the blade toward the workpiece with the slider 6 or the blade in operation, the edge of the blade reciprocating back and forth comes in contact with the workpiece and cuts the workpiece.

The second orbital mode is suitable for a wood workpiece, for example. The first orbital mode is suitable for a metal workpiece, for example.

As the fan 4 rotates with rotation of the motor shaft 80, the air around the fan 4 is forced radially outward. An airflow (blow) thus reaches the fan 4 through the inlets 31 after being through the motor housing 18. The airflow then flows to the body outlets 56 and the lower outlets 48. In other words, blows such as outlet blows WD, WL, WR, and W1 to W3 occur.

Such blows cool the components in the body housing 2.

In particular, the motor 3 is cooled by the inlet blow through the inlets 31 to the fan 4. The inlet blow cools the stator 71 and the rotor 72 by passing between the stator 71 and the rotor 72. The inlet blow also passes through the stator 71 and cools the stator 71.

The outlet blows WL and WR from the fan 4 to the body outlets 56 flow outside the power transmission housing 20. The outlet blows WL and WR cool the power transmission housing 20 and the components inside.

The outlet blow WD from the fan 4 to the lower outlets 48 cools the controller 40. The outlet blow WD flows near the controller case 44 covering the control circuit board 42. The outlet blow WD thus cools the control circuit board 42 appropriately.

The outlet blow W1 flows above the power transmission housing 20. The outlet blow W2 flows through the release drum 202 radially inward. The outlet blow W3 flows in front of the power transmission housing 20. The outlet blows W1 to W3 thus cool the power transmission housing 20 and the components inside and in front of the power transmission housing 20. The outlet blow W1 branches into the outlet blows W2 and W3. This allows less outlet blow W2 to flow toward the blade holder 138 than when the outlet blow W1 does not branch. This reduces dispersion of dust produced from a workpiece. Although the outlet blow W3 eventually flows forward, the outlet blow W3 does not flow toward the blade holder 138 but flows forward around the guide shoe unit 8 below the blade holder 138. This reduces dispersion of dust produced from a workpiece.

In response to the user turning off the switch body 34 by operating the trigger 33, the motor shaft 80 of the motor 3 stops to stop reciprocation motions and inflow and outflow of air. The lamp 62 turns off after a predetermined time.

Upon the lock lever 249 being open with a user's operation, the larger-diameter portion 240B of the pin 240 interferes with the left protrusion 226J and the right protrusion 226P although the user pulls the shoe 229 forward greatly without pressing the pin 240 through the raised portion 22P on the cover 22. The shoe 229 thus stops at the foremost sliding position and does not slip off. The shoe support 226 has the rear end that protrudes rearward from the left protrusion 226J and the right protrusion 226P. The shoe 229 is thus supported at the foremost sliding position in a sufficiently stable manner. The user can easily set the shoe 229 at the foremost sliding position by closing the lock lever 249 to lock the shoe 229 at the foremost sliding position. The shoe 229 at the foremost sliding position is locked by the left receiving portion 226K and the right receiving portion 226Q at the farther position.

Upon the lock lever 249 being open with a user's operation, the pin 240 is free of interference with the left protrusion 226J and the right protrusion 226P in response to a pressing operation of the pin 240 though the raised portion 22P on the cover 22 by the user. The shoe 229 is then movable forward beyond the foremost sliding position and can be detached. The user can detach the shoe 229 by operating the raised portion 22P (pin 240) on a portion adjacent to the lock lever 249 being open (rear portion). The operation for detaching the shoe 229 is thus easily performed.

The embodiments and the modifications are not limited to those described above. For example, the embodiments and the modifications may be further modified appropriately as described below.

In the pin unit 228, the pin 240 may have the larger-diameter portion 240B with a rounded lower end or the pin 240 may be spherical. In these structures, the shoe 229 is caught when being pulled out to its foremost sliding position without an operation on the pin 240. When the shoe 229 is pulled further forward with a pulling force of a predetermined degree or greater, the pin 240 moves over the left protrusion 226J and the right protrusion 226P, allowing the shoe 229 to move beyond the foremost sliding position and to be detached. The detached shoe 229 is attachable with the procedure reverse to the detachment procedure.

Orbital action (trajectory motion) of the blade holder 138 and other components is not limited to elliptical and semi-elliptical motions. For example, the orbital action may include reciprocation along an imaginary semi-elliptical arc (swinging).

The first flat surface 176 may not be the continuous flat surface including the first portion 176a and the second portion 176b. For example, the first flat surface 176 may include a flat first portion 176a and a flat second portion 176b at a distance from the first portion 176a. Such a first portion 176a and a second portion 176b may together support the slider 6 directly or indirectly. At least one of the first portion 176a or the second portion 176b may protrude from the surrounding portion.

The cam 130 may be arc-shaped, linear, or curved as viewed from above. The cam 130 may be located on the lower surface of the crank cam 108. The cam 130 may be separate from the crank cam 108.

At least one of a portion of the reciprocation converter 5, the reciprocation converter 5, or the orbital switcher 14 (orbital switching lever 170) may be located above the slider support 161.

The reciprocation converter 5 may include a crank and connecting rod (connecting rod type), in place of the crank cam 108 extending in the front-rear and lateral directions (horizontal crank type). In another example, the reciprocation converter 5 may include a rotational member with a sloping cylinder surface and swash bearings on the sloping cylinder surface (swash type).

The body outlets 56 may be located in a portion of the cover 22 frontward from the reciprocation converter 5. The body outlets 56 may be located in the power transmission housing 20. The lower outlets 48 may be located outside the controller 40.

The cover 22 may be halved into right and left covers.

Needle bearings may be used instead of ball bearings, or ball bearings may be used instead of needle bearings. At least one of the torque limiter 102 or the countershaft 104 may be eliminated. The size, arrangement, and number of at least the inlets 31, the body outlets 56, or the lower outlets 48 may be changed. The direction in which the battery 54 is attached or detached may be changed from the front-rear direction. Multiple batteries 54 may be attached. As described above, some of the components may be eliminated, or the number of components, their materials, shapes, types, and arrangement may be modified variously.

The tip tool may be any tool other than a blade.

In place of the battery 54, a cord may be used to supply power. The cord may be connected to utility power.

The embodiments and their modifications are applicable to reciprocating cutting tools other than the reciprocating saw 1 (e.g., a jigsaw), reciprocating tools other than reciprocating cutting tools, power tools, gardening tools, and electric work machines.

REFERENCE SIGNS LIST 1 reciprocating saw (reciprocating cutting tool)
3 motor
5 reciprocation converter
6 slider
20 power transmission housing
20b lower power transmission housing
220 shoe plate
222 shoe guide plate
222H hole
226 shoe support
226B bottom plate
226J left protrusion (protrusion)
226K left receiving portion
226L left wall
226P right protrusion (protrusion)
226Q right receiving portion
226R right wall
226S slit portion
229 shoe
230 screw
240 pin
250 shoe support engagement shaft
250C left cylindrical surface (cylindrical surface)
250D right cylindrical surface (cylindrical surface)
250F left flat surface (flat surface)
250G right flat surface (flat surface)
254 shoe lock unit

What is claimed is:

1. A reciprocating cutting tool, comprising:
 a motor;
 a slider (i) having a rod shape and (ii) including a tip tool holder (a) at a distal end of the slider and (b) configured to receive a tip tool;
 a reciprocation converter configured to convert rotation of the motor to reciprocation of the slider along a longitudinal axis of the slider;
 a housing that houses the motor, the slider and the reciprocation converter;
 a shoe (i) adjacent to the tip tool holder, (ii) slidable in a front-rear direction parallel to the longitudinal axis of the slider, and (iii) being configured to come in contact with a workpiece to which the tip tool is applied;
 a shoe lock unit configured to engage the shoe to restrict the shoe from sliding and be disengaged from the shoe to allow the shoe to slide;
 a shoe guide plate; and
 a pin, wherein:
 the shoe includes
  a shoe plate configured to come in contact with the workpiece; and
  a shoe support (i) supporting the shoe plate and (ii) having a slit extending in the front-rear direction;
 the slit has a first section having a first width that is constant, a second section having a second width and a narrowest portion having a third width;
 the narrowest portion is between the first section and the second section along the longitudinal axis;
 the third width is less than the first width and the second width;
 the pin is configured to interfere with the shoe when the shoe is in a predetermined position;
 the pin includes
  a smaller-diameter portion (i) extending in the vertical direction and (ii) having a diameter smaller than the third width, and
  a larger-diameter portion (i) extending in a vertical direction and (ii) having a diameter larger than the width of the slit at the narrowest portion;
 the shoe guide plate is configured to guide the shoe support;
 the pin is received in the slit;
 the housing includes a power transmission housing that houses the reciprocation converter;
 the shoe support is between the power transmission housing and the shoe guide plate;
 the shoe guide plate is fastened to the power transmission housing with a screw; and
 the screw is received in the slit.

2. The reciprocating cutting tool according to claim 1, wherein
 the pin is movable to a position free of interference with the shoe in response to an operation, and
 the pin, the shoe and the shoe lock unit are configured such that, when the shoe is out of engagement with the shoe lock unit and is free of interference with the pin, the shoe is detachable from the housing.

3. The reciprocating cutting tool according to claim 2, further comprising a biasing member that biases the pin to a position that interferes with movement of the shoe.

4. The reciprocating cutting tool according to claim 2, wherein
 the pin is adjacent to the shoe lock unit.

5. The reciprocating cutting tool according to claim 1, wherein the pin is adjacent to the shoe lock unit.

6. The reciprocating cutting tool according to claim 1, wherein
 the shoe support (i) extends along the longitudinal axis of the slider and (ii) includes
 a bottom plate,
 a left wall extending upward along a longitudinal axis of the pin from a first lateral side edge of the bottom plate, and
 a right wall extending upward along the longitudinal axis of the pin from a second lateral side edge of the bottom plate.

7. The reciprocating cutting tool according to claim 6, wherein
 the shoe plate is supported by at least one of the left wall or the right wall.

8. The reciprocating cutting tool according to claim 1, wherein
 the shoe guide plate has a hole receiving the pin.

9. The reciprocating cutting tool according to claim 1, wherein the predetermined position includes a foremost position at which the shoe is engaged with the shoe lock unit.

10. The reciprocating cutting tool according to claim 1, further comprising:
 an elastic member configured to vertically move the pin.

11. The reciprocating cutting tool according to claim 1, wherein the shoe, the shoe support and the pin are configured such that the pin moves relative to the slit in the front-rear direction between the predetermined position and another position in which the pin does not interfere with the shoe.

12. The reciprocating tool according to claim 1, wherein the shoe, the shoe support and the pin are configured such that, when the smaller-diameter portion of the pin is in the slit, the shoe can be removed from the housing.

13. The reciprocating tool according to claim 1, wherein the pin and the shoe are configured such that the shoe can slide relative to the pin when the larger-diameter portion of the pin is in the slit except the larger-diameter portion cannot enter the narrowest portion.

14. A reciprocating cutting tool, comprising:
a motor;
a slider (i) having a rod shape and (ii) including a tip tool holder (a) at a distal end of the slider and (b) configured to receive a tip tool;
a reciprocation converter configured to convert rotation of the motor to reciprocation of the slider along a longitudinal axis of the slider;
a housing that houses the motor, the slider and the reciprocation converter;
a shoe (i) adjacent to the tip tool holder, (ii) slidable in a front-rear direction parallel to the longitudinal axis of the slider, (iii) configured to come in contact with a workpiece to which the tip tool is applied, and (iv) including
 a shoe plate configured to come in contact with the workpiece,
 a shoe support (i) supporting the shoe plate and (ii) having a slit extending in the front-rear direction,
 a first engaging portion, and
 a second engaging portion;
a lock lever configured to lock or unlock the shoe;
an engagement shaft (i) connected to the lock lever in a rotatable manner with the lock lever and (ii) engageable with the first engaging portion;
a shoe lock unit configured to (i) engage the engagement shaft with the first engaging portion to restrict the shoe from sliding and (ii) disengage the engagement shaft from the first engaging portion to allow the shoe to slide;
a pin (i) engageable with the second engaging portion with the shoe is in a foremost position within a slidable range and (ii) movable to a position at which the pin does not interfere with the shoe; and
a shoe guide plate configured to guide the shoe support;
wherein
the shoe, the shoe lock unit and the pin are configured such that the shoe is detachable when the shoe lock unit allows the shoe to slide and the pin does not interfere with the shoe,
the pin is received in the slit,
the housing includes a power transmission housing that houses the reciprocation converter,
the shoe support is between the power transmission housing and the shoe guide plate,
the shoe guide plate is fastened to the power transmission housing with a screw, and
the screw is received in the slit.

* * * * *